US012808808B2

(12) United States Patent
Lu et al.

(10) Patent No.: US 12,808,808 B2
(45) Date of Patent: Nov. 24, 2026

(54) OPTICAL SENSOR SYSTEM FOR QUANTITATIVE COLORIMETRIC LIQUID ANALYSIS

(71) Applicant: International Business Machines Corporation, Armonk, NY (US)

(72) Inventors: Minhua Lu, Mohegan Lake, NY (US); Vince Siu, Thornhill (CA); Russell A. Budd, North Salem, NY (US); Youssef Anthony Asaad, Briarcliff Manor, NY (US); Evan Colgan, Montvale, NJ (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 18/203,022

(22) Filed: May 29, 2023

(65) Prior Publication Data

US 2023/0314331 A1 Oct. 5, 2023

Related U.S. Application Data

(62) Division of application No. 16/534,400, filed on Aug. 7, 2019, now Pat. No. 11,733,170.

(51) Int. Cl.
*G01N 21/80* (2006.01)
*G01N 21/77* (2006.01)
*G01N 21/84* (2006.01)
*H04M 1/72409* (2021.01)

(52) U.S. Cl.
CPC ......... *G01N 21/80* (2013.01); *G01N 21/8483* (2013.01); *H04M 1/72409* (2021.01); *G01N 2021/7759* (2013.01)

(58) Field of Classification Search
None
See application file for complete search history.

(56) References Cited

U.S. PATENT DOCUMENTS

| | | | |
|---|---|---|---|
| 3,883,247 | A | 5/1975 | Adams |
| 4,284,412 | A | 8/1981 | Hansen et al. |
| 4,596,035 | A | 6/1986 | Gershman et al. |
| 4,717,655 | A | 1/1988 | Fulwyler |
| 4,889,815 | A | 12/1989 | Bradwell et al. |

(Continued)

FOREIGN PATENT DOCUMENTS

| | | | |
|---|---|---|---|
| CN | 104964973 | A | 10/2015 |
| WO | WO2017002008 | A1 | 1/2017 |

OTHER PUBLICATIONS

D.H. Melik et al., "Turbidimetric Determination of Particle Size Distributions of Colloidal Systems," J. of Colloid and Interface Science, vol. 92, No. 1, pp. 161-180 (Mar. 1983).

(Continued)

*Primary Examiner* — Lore R Jarrett
(74) *Attorney, Agent, or Firm* — Kelsey M. Skodje

(57) ABSTRACT

Techniques for quantitative colorimetric liquid analysis with color and turbidity correction are provided. In one aspect, an optical detector includes: a vessel for containing a liquid sample; a light source on a first side of the vessel; a first sensor on a second side of the vessel opposite the first side and along a light path of the light source; and a second sensor on a third side of the vessel at an angle θ with respect to the light path. A method for quantitative measurement of an analyte is also provided, as is a method for color and turbidity analysis.

20 Claims, 15 Drawing Sheets

(56) References Cited

U.S. PATENT DOCUMENTS

| | | | | |
|---|---|---|---|---|
| 5,250,095 | A | 10/1993 | Sigel, Jr. et al. | |
| 6,030,845 | A | 2/2000 | Yamao et al. | |
| 6,394,952 | B1 | 5/2002 | Anderson et al. | |
| 9,506,855 | B2 | 11/2016 | Papautsky et al. | |
| 9,787,815 | B2 | 10/2017 | Erickson et al. | |
| 10,393,667 | B2 | 8/2019 | Budd et al. | |
| 10,605,741 | B2 | 3/2020 | Lu et al. | |
| 10,653,349 | B2 | 5/2020 | Delamarche et al. | |
| 11,039,765 | B2 | 6/2021 | Siu et al. | |
| 11,103,867 | B2 | 8/2021 | Lu et al. | |
| 11,169,093 | B2 | 11/2021 | Jackson et al. | |
| 11,287,404 | B2 | 3/2022 | Lu et al. | |
| 2007/0116595 | A1 | 5/2007 | Petrilla et al. | |
| 2008/0265146 | A1 * | 10/2008 | Coates | G01N 21/645 250/226 |
| 2009/0098022 | A1 * | 4/2009 | Tokhtuev | G01N 33/18 702/86 |
| 2010/0126286 | A1 * | 5/2010 | Self | G01N 35/04 73/863.81 |
| 2010/0167412 | A1 | 7/2010 | Xiao et al. | |
| 2013/0084630 | A1 | 4/2013 | Rolland et al. | |
| 2013/0203043 | A1 | 8/2013 | Ozcan et al. | |
| 2014/0240491 | A1 | 8/2014 | Kauniskangas et al. | |
| 2014/0301898 | A1 | 10/2014 | Phelan | |
| 2015/0044780 | A1 * | 2/2015 | Kurz | G01N 33/6827 702/85 |
| 2015/0046114 | A1 * | 2/2015 | Brueckner | G01N 21/82 702/104 |
| 2017/0027482 | A1 | 2/2017 | Zilberstein et al. | |
| 2017/0322133 | A1 | 11/2017 | Trainer | |
| 2018/0172600 | A1 * | 6/2018 | Wietzorrek | G03F 7/70225 |
| 2018/0252701 | A1 | 9/2018 | Rhodes et al. | |
| 2019/0298317 | A1 | 10/2019 | Colgan et al. | |
| 2021/0041368 | A1 | 2/2021 | Lu et al. | |

OTHER PUBLICATIONS

G. Smith et al., "Robust dipstick urinalysis using a low-cost, micro-volume slipping manifold and mobile phone platform," Lab Chip, May 2016, 16, (10 pages).

Lee et al., "A low-Cost, High-Performance System for Fluorescence Lateral Flow Assays," Biosensors, 3(4), 360-373 (Dec. 2013).

Sieben, V.J., et al., "Microfluidic colourimetric chemical analysis system: Application to nitrite detection," Analytical Methods, 2, 484-491 (Feb. 2010).

Geng et al., "Recent Progress in Optical Biosensors Based on Smartphone Platforms," Sensors, 17, 2449 (Oct. 2017) (19 pages).

List of IBM Patents or Applications Treated as Related, May 29, 2023 (2 pages).

* cited by examiner

OPTICAL SENSOR SYSTEM FOR QUANTITATIVE COLORIMETRIC LIQUID ANALYSIS

FIELD OF THE INVENTION

The present invention relates to colorimetric based liquid analysis, and more particularly, to an optical sensor system and techniques for use thereof for quantitative colorimetric liquid analysis with color and turbidity correction.

BACKGROUND OF THE INVENTION

Fluid sample testing often involves contacting a test strip with the sample, whereby the test strip contains reactants for one or more analytes. Test strips are commercially available for a variety of analytes such as blood glucose, pH, biomarkers, etc. For instance, well-known test strip brands include the Multistix (Siemens Medical Solutions, Munich Germany) or Chemstrip (Roche Diagnostics, Indianapolis, IN). Reaction of the analytes with the reactants on the test strip effects a color change that can then be detected using a reader. An example of commercially-available test strip readers include the Clinitek series (Siemens Medical Solutions) and Urisys systems Roche Diagnostics. Note that with test strips only a small amount of the sample liquid, which moistens the test pads, remains on the test pads so the color and turbidity of the liquid has little or no impact on the readings. In addition, the color and turbidity of samples is only assessed by visual inspection in clinical practice.

However, with commercial test strip readers the result is qualitative to semi-quantitative at best. Quantitative analysis currently requires large, complex instrumentation that is located in centralized laboratories. Sending samples to a centralized location for testing greatly increases the timeline of the diagnostic process, and introduces errors in the testing process due, for example, to the degradation of samples over time, improper handling during transport, etc. Thus, point-of care diagnostics are currently limited.

Further, fluid samples collected can vary in color (due for example to medications a subject is taking, diet, etc.) and/or turbidity (due for example to particulates in the sample such as microorganisms). Conventional testing techniques typically cannot account for color or turbidity variation in a given sample, oftentimes resulting in a sample simply being discounted or discarded. Otherwise, complex processing of the sample such as centrifugation is required prior to sample testing, which is not practical for point-of-care diagnostics.

Therefore, improved point-of-care quantitative colorimetric based liquid analysis techniques with color and turbidity correction would be desirable.

SUMMARY OF THE INVENTION

The present invention provides techniques for quantitative colorimetric liquid analysis with color and turbidity correction. In one aspect of the invention, an optical detector is provided. The optical detector includes: a vessel for containing a liquid sample; a light source on a first side of the vessel; a first sensor on a second side of the vessel opposite the first side and along a light path of the light source; and a second sensor on a third side of the vessel at an angle θ with respect to the light path.

In another aspect of the invention, a method for quantitative measurement of an analyte is provided. The method includes illuminating samples with different colors of light, wherein the samples include a first sample from which reagents are absent, and a second sample containing the reagents; measuring transmission and scattering intensity of light through the samples; and determining a concentration of an analyte in the samples using the measured transmission and scattering intensity of light and calibration curves created from multiple calibration samples having known varying amounts of the analyte and the reagents.

In yet another aspect of the invention, a method for color and turbidity analysis is provided. The method includes: placing a vessel containing a liquid sample into an optical detector, wherein the optical detector includes: (i) a light source on a first side of the vessel, (ii) a first sensor on a second side of the vessel opposite the first side and along a light path of the light source, and (iii) a second sensor on a third side of the vessel at an angle θ with respect to the light path; illuminating the liquid sample using the light source; measuring an intensity of transmitted light $I_t$ (λ) using the first sensor, and an intensity of scattered light $I_s$ (λ) using the second sensors; determining a color of the liquid sample using $I_t$ (λ); and determining a turbidity of the liquid sample using $I_s$ (λ).

A more complete understanding of the present invention, as well as further features and advantages of the present invention, will be obtained by reference to the following detailed description and drawings.

DETAILED DESCRIPTION OF PREFERRED EMBODIMENTS

As described above, current colorimetric testing techniques cannot perform quantitative analysis at the point-of-care. Thus, the capabilities of conventional colorimetric-based diagnostics are quite limited.

Advantageously, provided herein are optical sensor systems and techniques for use thereof for quantitative colorimetric liquid analysis with color and turbidity correction for high accuracy and high sensitivity analyte measurement. The present system performs quantitative transmission color and turbidity measurements through the liquid sample. Thus, it is critical to correct for the color and turbidity effect of the sample to achieve high accuracy analyte measurements. As will be described in detail below, the present techniques employ an integrated multiplex measurement and interference correction for color, turbidity, pH, protein, etc. Also provided herein are techniques for accurate, efficient and contamination-free sample collection and testing. As will be described in detail below, according to an exemplary embodiment, the system is embodied in a handheld device that preferably has wireless communications capabilities enabling data aggregation, analysis, trending and diagnostics from medical professionals, etc.

As highlighted above, the present techniques advantageously provide quantitative colorimetric liquid analysis with color and turbidity correction. For instance, FIGS. 1A and 1B depict an exemplary embodiment of an optical detector 100 for liquid analysis in accordance with the present techniques, in top-down and three-dimensional views, respectively.

Figure 1A:
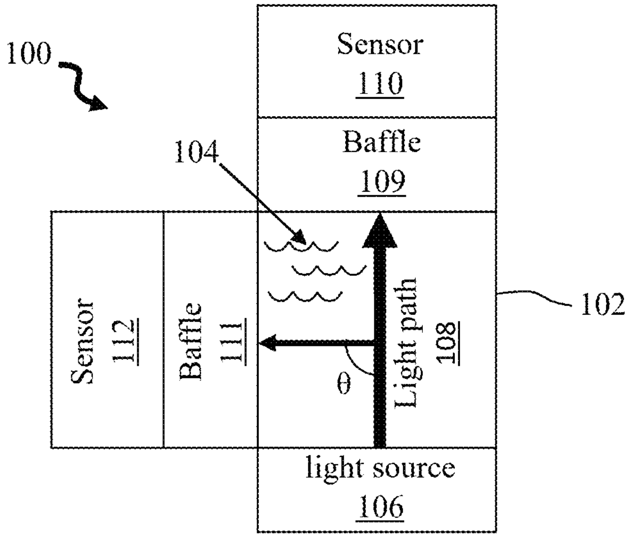
FIG. 1A is a top-down diagram illustrating an exemplary optical sensor for liquid analysis according to an embodiment of the present invention.
Figure 1B:
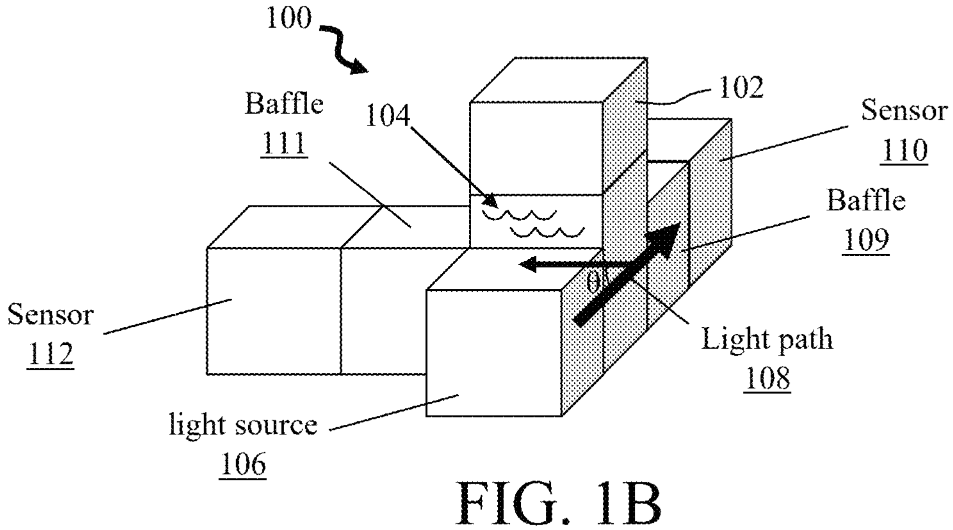
FIG. 1B is a three-dimensional diagram illustrating the exemplary optical sensor for liquid analysis according to an embodiment of the present invention.

As shown in FIGS. 1A and 1B, optical detector 100 includes in a vessel 102 (for containing a liquid sample 104), a light source 106 on a first side of the vessel 102/liquid sample 104 having a light path 108, a first sensor 110 and first baffle 109 on the light path 108 on a second side of the vessel 102/liquid sample 104 opposite the first side, and a second sensor 112 and second baffle 111 on a third side of the vessel 102/liquid sample 104 at an angle θ with respect to light path 108.

A suitable light source 106 includes, but is not limited to, multi-color light emitting diodes (LEDs) and/or lasers such as a vertical-cavity surface-emitting laser (VCSEL) or edge emitting laser diode. By "multi-color LEDs" it is meant that multiple LEDs are present which emit light at different colors/wavelengths such as red, green, blue and white. Each of these LEDs can be individually turned on to provide different color illumination, thus providing illumination with select spectrums of light.

Generally, any test vessel with optical windows for optical sensing can be employed as vessel 102. By way of example only, suitable vessels 102 include, but are not limited to, cuvettes (which has transparent sides or windows), vials, bottles and/or test tubes. formed from an optically transparent material such as glass, plastic or fused quartz. Reference made herein to placement of the light source and sensors relative to the sides of vessel 102, generally refers to positions to the left/right and/or front back of vessel 102.

As will be described in detail below, sensor 110 is located in the light path 108 and is used for color analysis of liquid sample 104 by measuring the transmittance or transmission image of liquid sample 104. For instance, according to an exemplary embodiment, data from sensor 110 is implemented to measure the transmittance of liquid sample 104 at specific wavelengths (i.e., red, green, blue) of light and/or a band of the spectrum of light. Further, when image data is captured by sensor 110 (see imagers below), color and/or image analysis of the liquid sample 104 under illumination (by light source 106) can be used to analyze the color and/or texture of the liquid sample 104.

Sensor 112 is located at angle θ with respect to light path 108 and is used for turbidity analysis and particle size analysis by measuring the scattered light at different wavelengths. According to an exemplary embodiment, θ is from about 0 degrees to about 180 degrees and ranges therebetween, preferably from about 45 degrees to about 90 degrees and ranges therebetween. Baffles 109 and 111 in between the liquid sample 104 and sensors 110 and 112, respectively, serve to prevent stray light from directly entering sensors 110 and 112, such that optical detector 100 can be operated under any ambient light conditions without the need of a light cover.

Suitable sensors 110 and 112 include but are not limited to, photodetectors, photodiodes and/or imagers. By way of example only, suitable imagers include, but are not limited to, charge-coupled device/complementary metal oxide semiconductor CCD/CMOS imagers. According to an exemplary embodiment, measurement of the scattered light is used to quantify the turbidity of the liquid sample 104. The density and size of the suspension particles can also be analyzed from the scattered light data.

Figure 2:
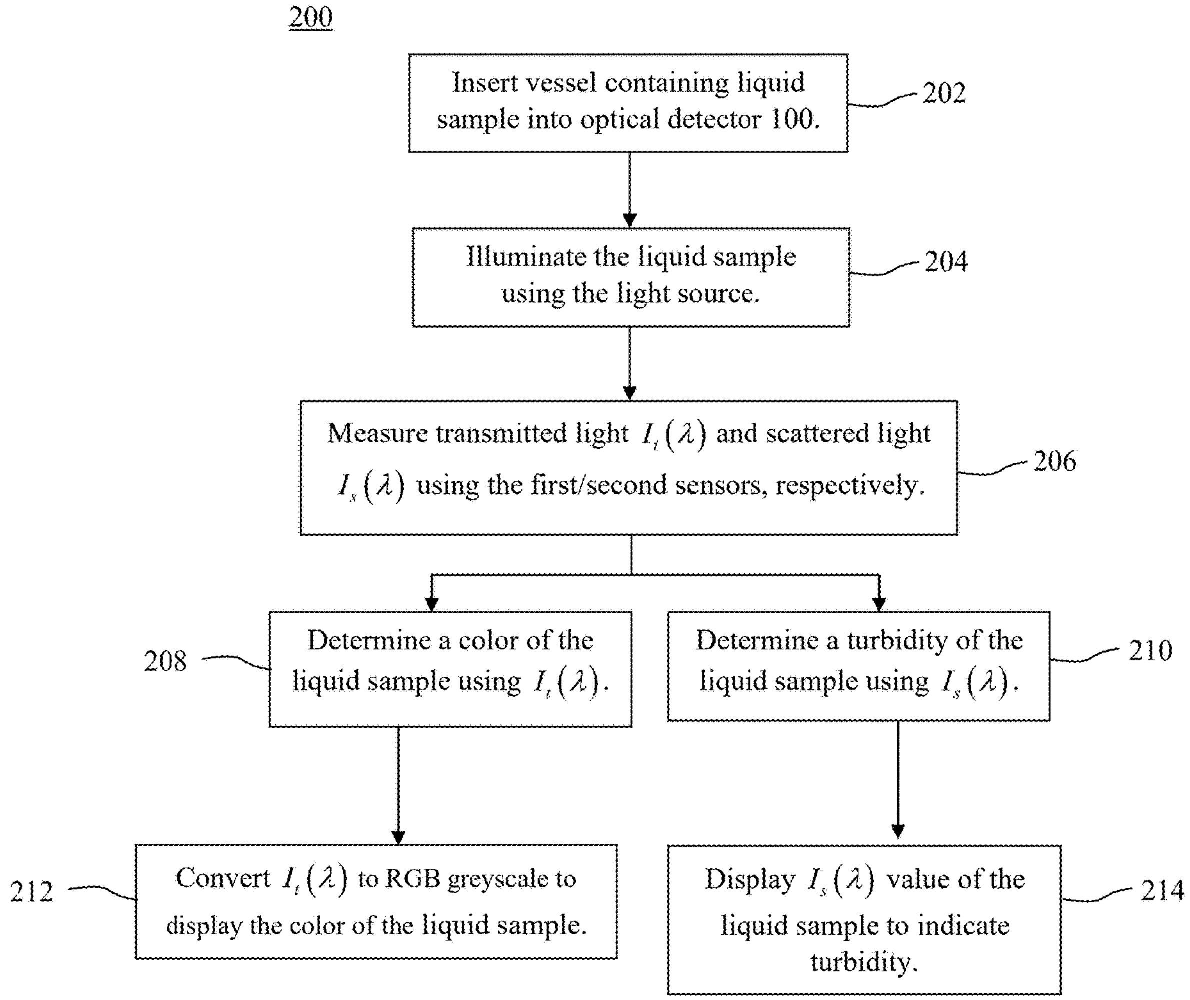
FIG. 2 is a diagram illustrating an exemplary methodology for color and turbidity analysis according to an embodiment of the present invention.

An exemplary methodology for color and turbidity analysis using optical detector 100 is now described by way of reference to methodology 200 of FIG. 2. In step 202, vessel 102 containing a liquid sample 104 is inserted into optical detector 100. As provided above, this places the vessel 102/liquid sample 104 in between the light source 106 and sensors 110/112, with the light source 106 and sensor 110 located on opposite sides of vessel 102/liquid sample 104 (i.e. along light path 108) and sensor 112 is located at angle θ with respect to light path 108.

According to an exemplary embodiment, the present techniques are performed for urinalysis on a patient sample. By way of example only, urinalysis can target the detection of certain biomarkers (also referred to herein generally as 'analytes') such as pH, specific gravity, leucocytes, nitrate, protein, glucose, ketones, urobilinogen, bilirubin, and blood, and may also include other biomarkers for sepsis/inflammation, bacterial speciation, tumor markers, and fibril aggregation. During the detection process, a detection reagent for one or more these biomarkers is added to a sample and, if the target biomarker is present, the detection reagent will change the color of the sample.

In step 204, light source 106 is used to illuminate liquid sample 104. According to an exemplary embodiment, during step 204 the light source 106 is programmed to cycle through different wavelengths/colors of light (e.g., red, green, blue, white, etc.). In step 206, sensors 110 and 112 are used to measure the transmitted light $I_t$ (λ), and the scattered light $I_s$ (λ), through the liquid sample 104 at the different wavelengths, respectively.

In step 208, the color of liquid sample 104 is determined from $I_t$ (λ). In step 210, the turbidity of liquid sample 104 is determined from $I_s$ (λ). The term "turbidity," as used herein refers to the cloudiness of the liquid sample.

According to an exemplary embodiment, the measured color of the sample, $I_t$ (λ), is translated to a corresponding 16-bit RGB grey scale value so that it can be appropriately displayed on an electronic device. This is accomplished in step 212 by multiplying the normalized RGB values by 255. The scattering intensity value for white illumination, $I_{sW}$, is displayed as a numerical value on an electronic device along with the corresponding measured color in step 214. Note that the scattering intensity values from other colors could also be used, or a combination of them. The scattering intensity value can also be converted to an optical density value as described in conjunction with the description of FIG. 15 below. For example, in the case where liquid sample 104 is a patient sample, the information above can be used to assess the status of the patient/subject such as hydration level, using of medications that can affect the color of the liquid sample 104, etc. For example, in the case of a patient sample, the turbidity can be correlated to the presence, magnitude and size distribution of particulates in the liquid sample 104 such as microorganisms (e.g., bacteria), protein, etc.

Figure 3:
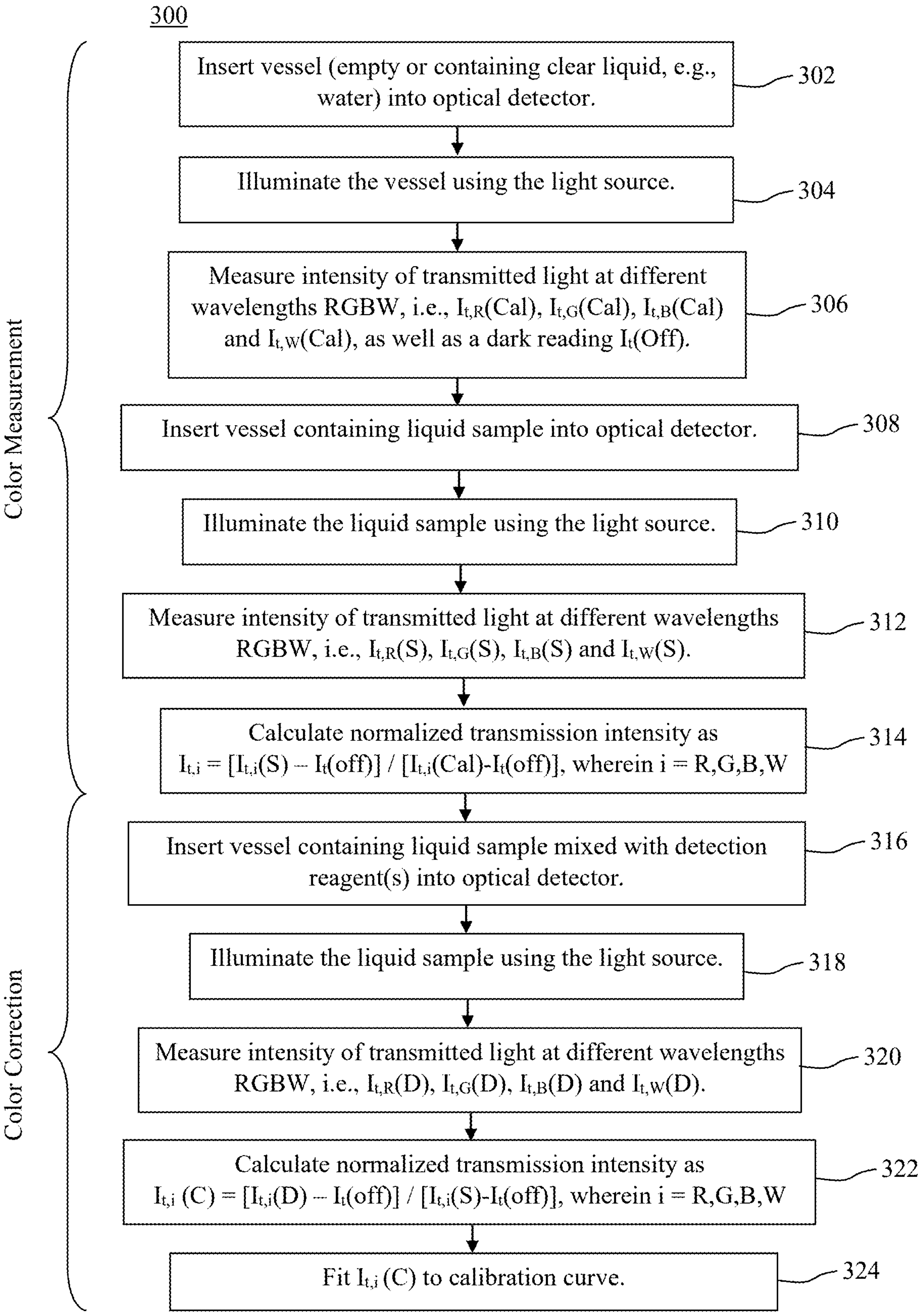
FIG. 3 is a diagram illustrating an exemplary methodology for color measurement and correction according to an embodiment of the present invention.

Given the overview in methodology 200 for color and turbidity analysis using optical detector 100, an exemplary implementation of optical detector 100 for color measurement and color correction for analyte measurements is now described by way of reference to methodology 300 of FIG. 3. The color of the liquid sample will impact the transmission measurement, which in turn will affect the accuracy of the detection of analyte.

In step 302, vessel 102 is inserted into optical detector 100. At this calibration (Cal) stage, vessel 102 is either empty or contains a clear liquid such as water.

In step 304, light source 106 is used to illuminate the empty or water-filled vessel 102. According to an exemplary embodiment, during step 304 the light source 106 is programmed to cycle through different wavelengths/colors of light (e.g., red (R), green (G), blue (B), white (W), etc.). In step 306, sensor 110 is used to measure the intensity of the transmitted light $I_t$ (λ) through the empty or water-filled vessel 102 at the different wavelengths RGBW, i.e., $I_{tR}$(Cal), $I_{t,G}$(Cal), $I_{t,B}$(Cal) and $I_{t,W}$(Cal), as well as a dark reading $I_t$(Off), wherein 'Cal' denotes calibration.

The process is then repeated with a liquid sample (rather than with an empty or water-filled vessel). Namely, in step 308 liquid sample 104 is placed in vessel 102 (or the empty or water-filled vessel is removed and a new vessel containing the liquid sample 104 is inserted into optical detector 100), and in step 310 light source 106 is used to illuminate the liquid sample 104, i.e., by cycling through the different wavelengths/colors of light (e.g., red (R), green (G), blue (B), white (W), etc.). In step 312, sensor 110 is used to measure the intensity of the transmitted light $I_t$ (λ) through the liquid sample 104 at the different wavelengths RGBW, i.e., $I_{t,R}$(S), $I_{t,G}$(S), $I_{t,B}$(S) and $I_{t,W}$(S), wherein 't' denotes transmission, and 'S' denotes sample. No reagent is present in this sample.

In step 314, the normalized transmission intensity is calculated for the RGBW wavelengths of light as:

$$I_{t,i} = [I_{t,i}(S) - I_t(\text{off})]/[I_{t,i}(Cal) - I_t(\text{off})], \tag{1}$$

wherein i=R,G,B,W. The normalized sample transmission intensity can then be converted to a 16 bit RGB color value by multiplying by 255. Namely, 255 is the value of 16 bits. Color displays use RGB pixels, each with 16 bit greyscales to display 16*16*16 colors. A normalized intensity of 1 means 100% transmission, and 0 means dark. By multiply the normalized intensity by 255 it converts the transmission of RGB color of light into 16 bit greyscale to reconstruct the color of the liquid on the display.

The normalized transmission intensity values of the sample can then be used to correct the color effects of sample on the biomarker detection using the liquid sample mixed with at least one detection reagent. As provided above, if the target biomarker is present, the detection reagent will change the color of the sample. Advantageously, the present techniques correct for any background color variations in the sample on the measured analyte results.

Namely, in step 316 the liquid sample 104 mixed with at least one detection reagent is placed in vessel 102 (e.g., the detection reagent(s) can be added to the sample already present in the vessel, or the vessel with the sample can be removed and a new vessel containing the liquid sample 104 mixed with the detection reagent is inserted into optical detector 100), and in step 318 light source 106 is used to illuminate the liquid sample 104 mixed with the detection reagent(s), i.e., by cycling through the different wavelengths/colors of light (e.g., red (R), green (G), blue (B), white (W), etc.). In step 320, sensor 110 is used to measure the intensity of the transmitted light $I_t$ (λ) through the liquid sample 104 mixed with the detection reagent(s) at the different wavelengths RGBW, i.e., $I_{t,R}$(D), $I_{t,G}$(D), $I_{t,B}$(D) and $I_{t,W}$(D), wherein 'D' denotes the presence of the detection reagent(s).

In step 322, the normalized detection reagent transmission intensity is calculated for the RGBW wavelengths of light as:

$$I_{t,i}(C)=[I_{t,i}(D)-I_t(\text{off})]/[I_{t,i}(S)-I_t(\text{off})], \tag{2}$$

wherein i=R,G,B,W. Finally, in step 324 the normalized intensity with detection reagent $I_{t,i}$(C) is compared to a calibration curve to determine the analyte (e.g., leucocytes, nitrate, protein, etc.) concentration. This could be done by fitting an equation to the calibration curve and using the measured $I_{t,i}$(C) to calculate the analyte concentration. For instance, by way of example only, a calibration curve can be obtained by spiking a base matrix such as a buffer with a series of known and varying analyte concentrations and reagents to use as a set of samples. The detection reagent is then mixed with those samples, and the transmission intensity with is measured using the present optical detector. The above-described background subtraction and normalization processes are performed to get a plot of normalized intensity versus analyte concentration. Then curve fitting an equation to the plot to get a fitting function for normalized intensity versus analyte concentration; I=f (concentration), which represents the calibration curve. Thus, a measured intensity can be plugged into the calibration curve/function, to solve for concentration, i.e., concentration=$f^1$(I).

In its most basic form, methodology 300 is performed using a single optical detector 100, whereby the above-described processes of making color measurements with an empty or water-filled vessel, then with a liquid sample and no reagent, and finally with the liquid sample mixed with detection reagent(s) are performed in sequence. Doing so, however, is time consuming as one has to repeat the same steps in sequence. However, advantageously, provided herein are system designs having multiple optical detectors which enables these multiple measurements to be made simultaneously. See, for example, methodology 1000 described in conjunction with the description of FIG. 10, below. Note that multiple reagents are used to detect multiple analytes, each of which requires an individual sample, and corresponding measurements, for each analyte.

Figure 4:
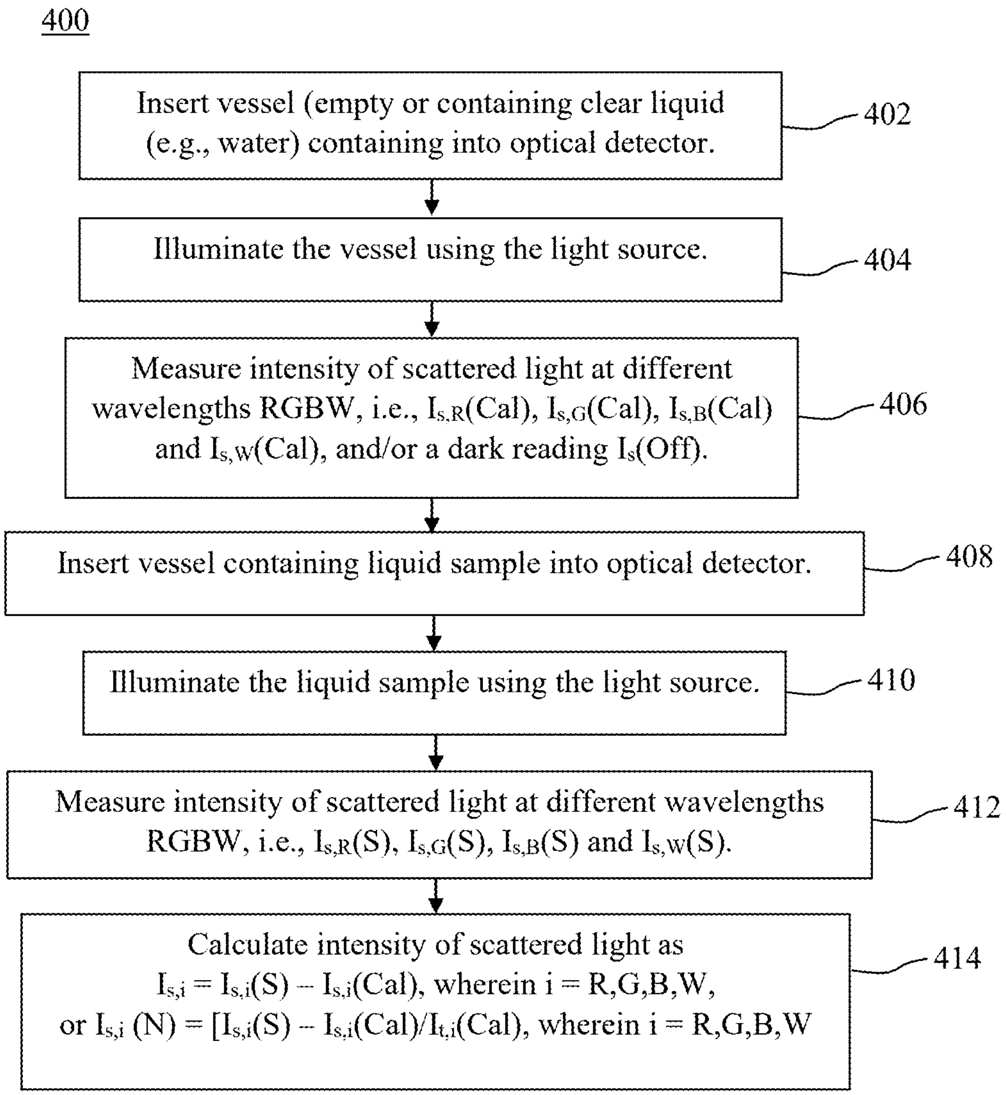
FIG. 4 is a diagram illustrating an exemplary methodology for turbidity measurement and correction according to an embodiment of the present invention.

A similar process is employed for turbidity measurement and turbidity correction for analyte measurements using sensor 112 which, as described above, is located at angle θ with respect to light path 108. See, for example, methodology 400 of FIG. 4. In step 402, vessel 102 is inserted into optical detector 100. At this calibration (Cal) stage, vessel 102 is either empty or contains a clear liquid such as water. In step 404, light source 106 is used to illuminate the empty or water-filled vessel 102, i.e., by cycling through the different wavelengths/colors of light (e.g., red (R), green (G), blue (B), white (W), etc.). In step 406, sensor 112 is used to measure the intensity of the scattered light $I_s$ (λ) through the empty or water-filled vessel 102 at the different wavelengths RGBW, i.e., $I_{s,R}$(Cal), $I_{s,G}$(Cal), $I_{s,B}$(Cal) and $I_{s,W}$(Cal), as well as a dark reading $I_s$(off), wherein 's' denotes scattering and 'Cal' denotes calibration.

It is notable that the difference between $I_{s,i}$(Cal) and Is(off) indicates the light isolation. In the present optical detector design, the baffles which are located between the sample and the sensors successfully block stray light as well as light from the light source from entering the detector. Therefore, the difference between $I_{s,i}$(Cal) and $I_s$(off) is within the noise, and it is not necessary to measure every $I_{s,i}$(Cal) and $I_s$(off), one can use any of them as background. However, for a not well optically isolated design, the measurement of $I_{s,i}$(Cal) is necessary for accurate turbidity measurement.

The process is then repeated with a liquid sample without reagent added (rather than with an empty or water-filled vessel). Namely, in step 408 liquid sample 104 is placed in vessel 102 (or the empty or water-filled vessel is removed and a new vessel containing the liquid sample 104 is inserted into optical detector 100), and in step 410 light source 106 is used to illuminate the liquid sample 104, i.e., by cycling through the different wavelengths/colors of light (e.g., red (R), green (G), blue (B), white (W), etc.). In step 412, sensor 112 is used to measure the intensity of the scattered light $I_s$ (λ) through the liquid sample 104 at the different wavelengths RGBW, i.e., $I_{s,R}$(S), $I_{s,G}$(S), $I_{s,B}$(S) and $I_{s,W}$(S), wherein 'S' denotes sample.

In step 414, the net scattering intensity is calculated for the RGBW wavelengths of light as:

$$I_{s,i}=I_{s,i}(S)-I_{s,i}(Cal), \tag{3}$$

wherein i=R,G,B,W, and $I_{s,i}$ is the net scattering intensity with background subtracted. The scattering intensity can then be converted to optical density using a calibration curve if needed. The scattered intensity $I_{s,i}$ can be used directly or can be normalized by that transmission calibration value $I_{s,i}(N)=I_{s,i}/I_{t,i}(Cal)$ to remove variations due to illumination intensity, wherein 'N' denotes normalized. As described below, the primary impact of turbidity in the sample is to decrease the intensity of the transmitted light intensity. How to correct for this in the calculation of the analyte concentration is described below.

For instance, the urinalysis sample from a patient with an infection can be cloudy due to the bacterial growth, with the cloudiness corresponding to the severity of the infection. Some types of bacteria do not convert nitrate to nitrite, and therefore cannot be detected by a nitrite test alone. A quantitative turbidity assessment can assist in diagnostics, independent of the nitrite value. Another application of turbidity measurement is for protein detection. Protein precipitation tests such as a sulfosalicylic acid precipitation test (SSA) are common methods used for measuring total protein. However, they currently use a visual assessment to estimate protein concentration. A quantitative measurement can greatly improve the accuracy of the test. For instance, by way of example only, a calibration curve for SSA testing can be obtained by spiking a base matrix such as a buffer with a series of known analyte concentrations, such as protein, to use as a set of samples. SSA reagents are added to the samples and both scattering and transmission intensities are measured with the first and second sensor. The above-described background subtraction and normalization processes are performed to obtain a plot of normalized intensity versus analyte concentration. Then curve fitting an equation to the plot is performed to get a fitting function for normalized scattering intensity versus analyte concentration; $I_s=f_s$ (concentration), which represents the calibration curve. Thus, a measured intensity can be plugged into the calibration curve/function, to solve for concentration, i.e., concentration$=f_s^{-1}(I)$.

By way of example only, a turbidity calibration curve can be built using a set of samples with different turbidity levels. The scattering intensity is measured with the present optical detector while the optical density (OD) is measured with other instruments, such as a nanodrop OD600 available from ThermoFisher Scientific, Waltham, MA.

Since the light scattering strongly depends on the particle size and size distribution, it is best to measure light scattering at different wavelengths for different type of suspensions and build a scattering model database, and then use machine learning to determine the best fitting model. Due to the scattering dependence on particle size and particle size distribution, the value of the scattering intensity can be used as a measure of the cloudiness and determine normal value range by comparing to known standards. By way of example only, particle size and distribution in the liquid can be measured or estimated with multi-wavelength photometer. It is notable that different samples might have different particle size and particle size distributions, therefore the scattering property is different and the corresponding OD is different. For the visible spectrum, it is possible to use blue and red scattering to get an estimate on the particle size and distribution if the particles are about a micrometer in size. Much smaller or bigger particles could be difficult to detect and measure by visible light.

Figure 5:
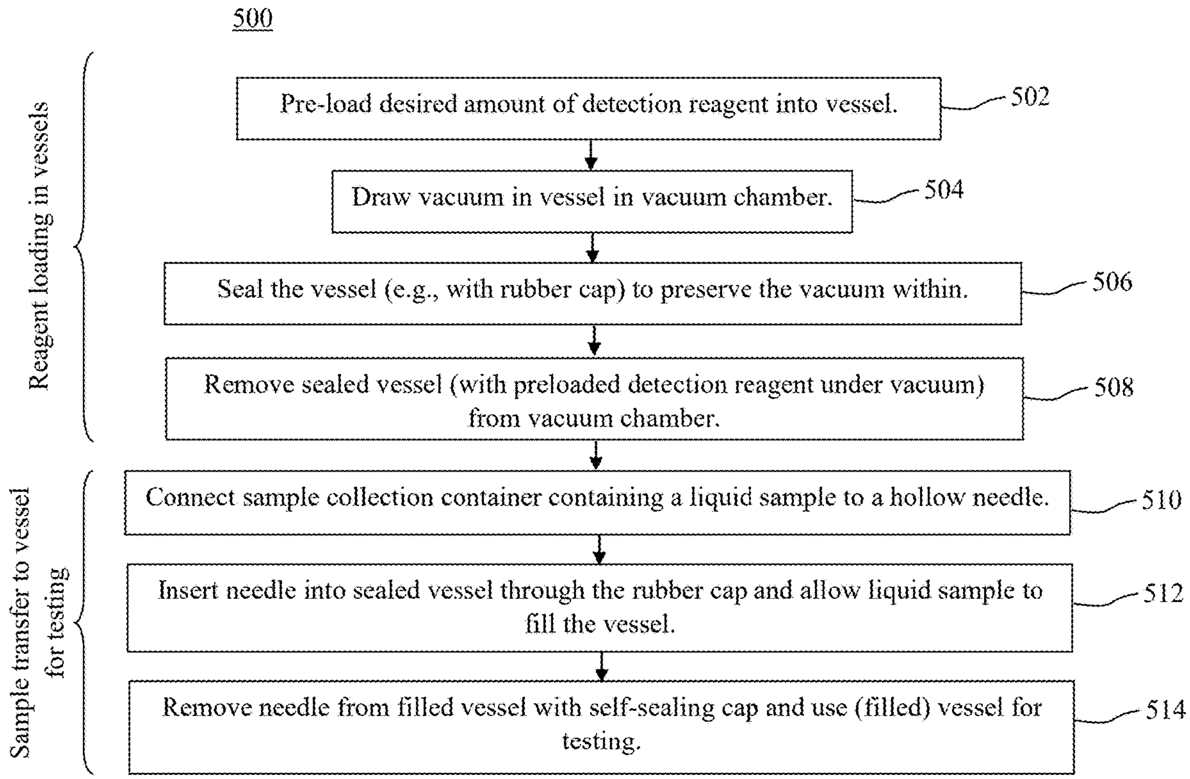
FIG. 5 is a diagram illustrating an exemplary methodology for liquid sample and detection reagent mixing according to an embodiment of the present invention.

Also provided herein are techniques for liquid sample and detection reagent mixing that enable control of the sample volume for quantitative measurement, ensures reagent preservation and stability, and prevents sample contamination. See, for example, methodology 500 of FIG. 5 for sample collection. In step 502, a desired amount of the detection reagent is pre-loaded into vessel 102. The detection reagent can be a liquid and/or a solid.

In step 504, vessel 102 (with pre-loaded detection reagent) is placed in a vacuum chamber and a vacuum is drawn, e.g., down to a pressure of about 1 millibar (mBar) for a solid detection reagent or to the vapor pressure of the reagent if it is a liquid detection reagent. Optionally, liquid detection reagents can first be freeze dried, if so desired. Freeze drying is a gentle yet fast way to remove water from delicate biospecimens and reagents. Freeze drying can help to preserve sensitive bio reagents from degradation due to heat.

In step 506, the opening of vessel 102 (with pre-loaded detection reagent) is sealed while in the vacuum to preserve the vacuum within. According to an exemplary embodiment, the vessel 102 is sealed with a rubber cap. Use of a rubber cap is beneficial as it enables the liquid sample 104 to be introduced into vessel 102, e.g., using a syringe, and will be self-sealing once the syringe is removed, thereby avoiding sample contamination.

In step 508, the vacuum in the vacuum chamber is released and the sealed vessel 102 (with pre-loaded detection reagent that is under vacuum) is removed from the vacuum chamber. This process can be used to prepare multiple vessels 102, optionally containing different detection reagents and/or different amounts of the same detection reagents. These vessels 102 with pre-loaded detection reagent that are under vacuum can then be stored for use in future diagnostic testing procedures.

For instance, in step 510 a sample collection container containing liquid sample 104 is connected to a hollow syringe needle. By way of example only, the needle can be connected to the sample collection container via a Luer lock, a valve, or a connector. In step 512, the needle is inserted into the sealed vessel 102 (with pre-loaded detection reagent) through the rubber cap and the liquid sample 104 from the sample collection container is allowed to fill the vessel 102. Filling of the vessel is mediated by the vacuum drawn on the vessel 102 (as described above), and embodiments are contemplated herein where the pre-determined amount of liquid sample 104 drawn into vessel 102 is regulated by the amount of vacuum drawn on the vessel 102 in step 504 (see above). In step 514, once vessel 102 has been filled with the appropriate amount of the liquid sample 104, the needle is withdrawn from the rubber cap which, as highlighted above, will then self-seal avoiding risks of sample contamination. The vessel 102 now containing liquid sample 104 mixed with the (pre-loaded) detection reagent can then be analyzed using optical detector 100, i.e., by inserting the vessel 102 into optical detector 100. See, for example, step 202 of methodology 200, etc. —described above.

According to an exemplary embodiment, an optical sensing system is also contemplated herein which includes multiple optical detectors 100*a, b, c*, etc. See, for example, optical sensing system 600 provided in FIG. 6. Advantageously, a system containing multiple optical detectors can measure a panel of analytes at once. For disease diagnostics, it is often the case that multiple analytes are required. For example, protein and creatinine are often paired for kidney disease diagnosis. In addition, some analytes are known to interfere with the measurement of other analytes. For example, pH can affect the results on many measurements. Thus, a simultaneous measurement of pH alone can be used to correct the measurement of other analytes such as nitrite and protein.

Figure 6:
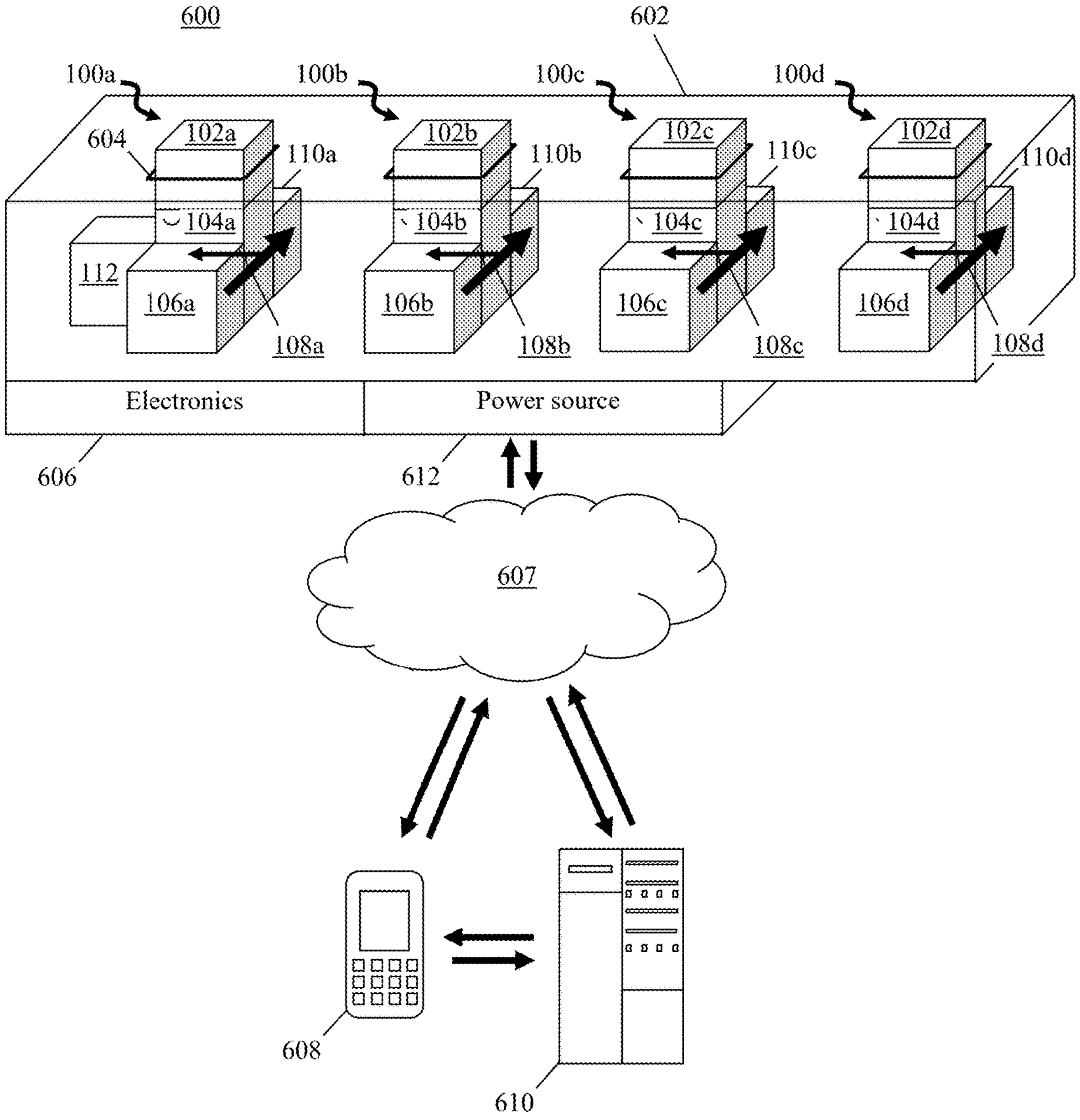
FIG. 6 is a diagram illustrating an exemplary optical sensing system according to an embodiment of the present invention.

Each of the optical detectors 100*a, b, c*, etc. is configured to operate in the same manner as described in conjunction with the description of optical detector 100 above. Namely, as shown in FIG. 6, optical detector 100*a* includes a vessel 102*a* (for containing a liquid sample 104*a*), a light source 106*a* on a first side of the vessel 102*a*/liquid sample 104*a* having a light path 108*a*, a first sensor 110*a* on the light path 108*a* on a second side of the vessel 102*a*/liquid sample 104*a* opposite the first side, and a second sensor 112 on a third side of the vessel 102*a*/liquid sample 104*a* at an angle θ with respect to light path 108*a*. Each of these components (i.e., vessel, light source, sensors, etc.) was described in detail above. The same applies to the components of optical detector 100*b*, and so on. The only difference is that, according to an exemplary embodiment, only one optical detector (in this case optical detector 100*a*) has a second sensor 112. In that case, the turbidity measurements can be made via optical detector 100*a*. However, in another case, more than one optical detector can have both first and second sensors. For example, one of optical detectors with two sensors can be used to measure the color and turbidity of the sample, and another optical detector with two sensors can be used to measure the concentration of an analyte such as protein using a precipitation method, as described above.

Further, having multiple optical detectors enables multiple measurements to be made simultaneously. For instance, the processes of making color measurements with an empty or water-filled vessel, a liquid sample, and liquid sample(s)

mixed with detection reagent can be done simultaneously. See, for example, methodology 1000 described in conjunction with the description of FIG. 10, below.

As shown in FIG. 6, the optical detectors 100*a, b, c*, etc. are enclosed in a case 602. Case 602 has ports 604 therein for inserting vessels 102*a, b, c*, etc. into optical detectors 100*a, b, c*, etc., respectively.

According to an exemplary embodiment, optical sensing system 600 is a portable, handheld device. For instance, as shown in FIG. 6, optical sensing system 600 includes electronics module 606 that can communicate with a mobile device 608 (such as a smartphone) and/or a computer 610 and/or cloud wirelessly, e.g., through WiFi™ or Bluetooth®. As shown in FIG. 6, mobile device 608 can also communicate (e.g., wirelessly) with computer 610 and/or a server or cloud 607. An exemplary apparatus that can be configured to serve as computer 610 and/or a server or cloud 607 is described in conjunction with the description of FIG. 7, below. According to an exemplary embodiment, electronics module 606 contains a microprocessor that is configured to operate and control the light sources 106*a, b, c*, etc. and each sensor 110/112*a, b, c*, etc. For instance, when a vessel 102*a, b, c*, etc. is inserted in the optical detector, electronics module 606 control cycles the respective light sources 106*a, b, c*, etc. through the various wavelengths (see above) and coordinates data collection via the sensors 110/112*a, b, c*, etc. Preferably, electronics module 606 will communicate with mobile device 608 and transmit data to mobile device 608 and cloud 607 for data storage and data analysis.

As shown in FIG. 6, optical sensing system 600 also includes a power source 612 such as a battery for powering the light sources 106*a, b, c*, etc. and sensors 110/112*a, b, c*, etc. of each optical detectors 100*a, b, c*, etc., and electronics module 606. A battery enables portability of optical sensing system 600.

As described in detail above, the present techniques involve color and turbidity interference correction during sample testing. According to an exemplary embodiment, the color/turbidity interference correction calculations detailed above are implemented via a software program loaded in electronics module 606, mobile device 608 and/or computer 610 and/or server or cloud 607. Further, the software program can collect, analyze and transmit data to mobile device 608 and/or computer 610 and/or server or cloud 607 and obtain feedback with secured protocols.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
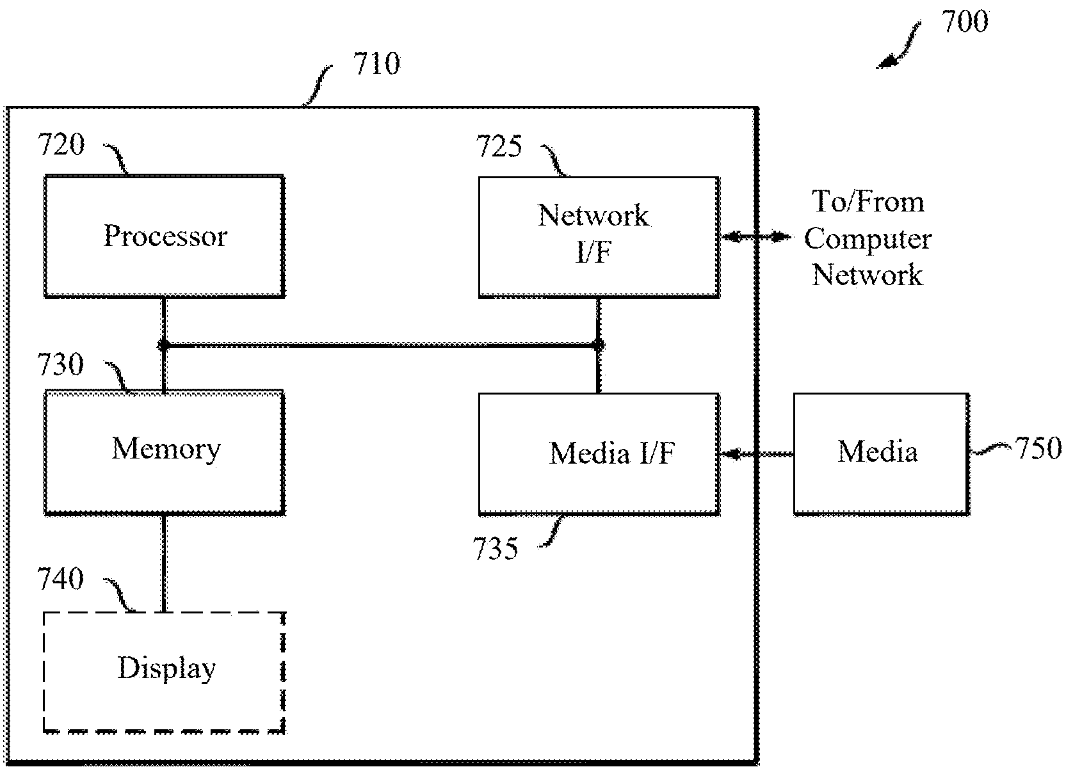
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, computer 610 of optical sensing system 600 can be embodied in apparatus 700, and apparatus 700 can be configured to perform one or more steps of methodology 200 of FIG. 2, one or more steps of methodology 300 of FIG. 3, one or more steps of methodology 400 of FIG. 4, one or more steps of methodology 500 of FIG. 5, etc.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

As described, e.g., in accordance with the description of step 314 of methodology 300, above, the normalized transmission intensity of a liquid sample can be converted to a 16 bit RGB color value. Doing so enables reconstruction of the color of the liquid sample on a color display, such as display 740.

Figures 8A, 8B, 8C:
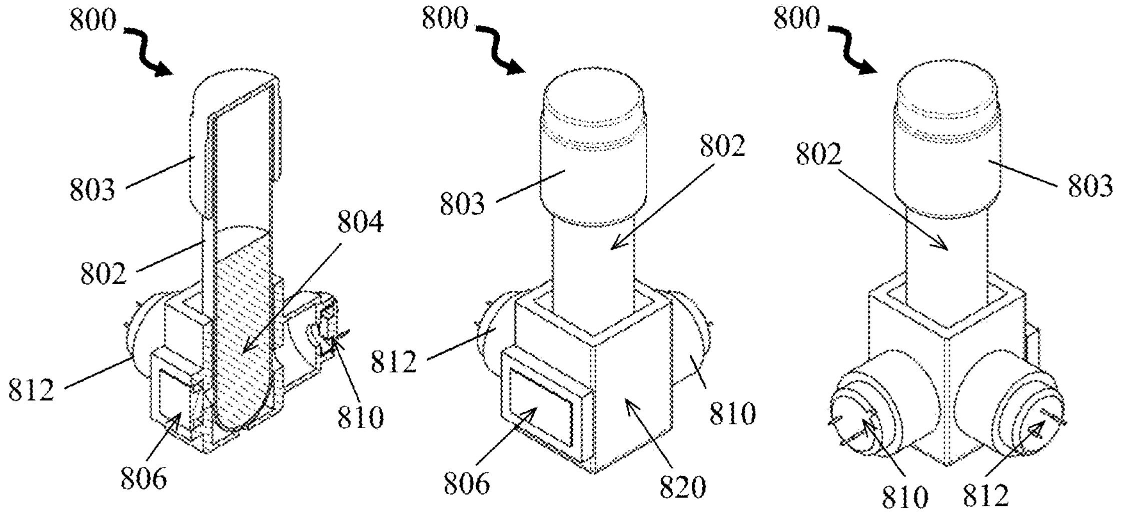
FIG. 8A is a cross-sectional diagram illustrating an exemplary configuration of the present optical detector according to an embodiment of the present invention.
FIG. 8B is a three-dimensional diagram illustrating the exemplary optical detector according to an embodiment of the present invention.
FIG. 8C is a three-dimensional diagram illustrating the exemplary optical detector according to an embodiment of the present invention.

FIGS. 8A-C are diagrams illustrating different views of an exemplary configuration of the present optical detector design. Specifically, FIG. 8A provides a cross-sectional view of an optical detector 800. As shown in FIG. 8A, optical detector 800 includes a vessel 802 (for containing a liquid sample 804), a light source 806 on a first side of the vessel 802/liquid sample 804, a first sensor 810 on a second side of the vessel 802/liquid sample 804 along a light path of the light source 806, and a second sensor 812 on a third side of the vessel 802/liquid sample 804 at an angle with respect to the light path of the light source 806.

According to an exemplary embodiment, vessel 802 has a rubber cap 803 which serves to maintain a vacuum within vessel 802 (see above). In this example, light source 806 is an LED, and sensors 810 and 812 are photodetectors.

FIG. 8B provides a three-dimensional view of optical detector 800. As shown in FIG. 8B, light source 806, first sensor 810 and second sensor 812 can be located within a housing 820. Vessel 802 is inserted into the middle of housing 820 between light source 806, first sensor 810 and second sensor 812. FIG. 8C provides a rotated three-dimensional view of optical detector 800.

Figure 9:
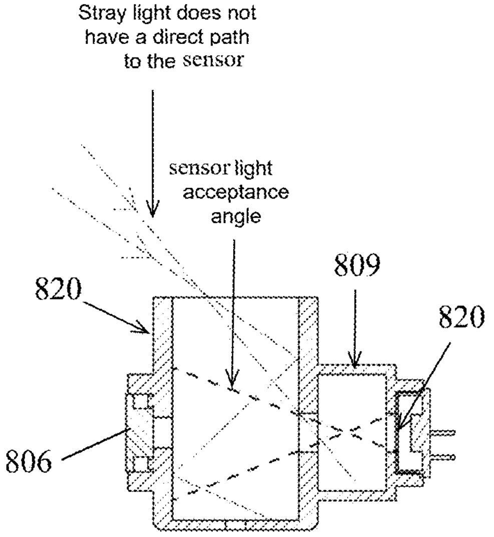
FIG. 9 is a cross-sectional diagram illustrating how employing baffles prevents stray light from having a direct path to the sensors according to an embodiment of the present invention.

FIG. 9 provides a cross-sectional diagram of housing 820 illustrating how the baffles prevent stray light from having a direct path to the sensors. Namely, any external stray light that enters the housing 820 is not within the sensor light acceptance angle, and thus will not reach the sensors.

Figure 10:
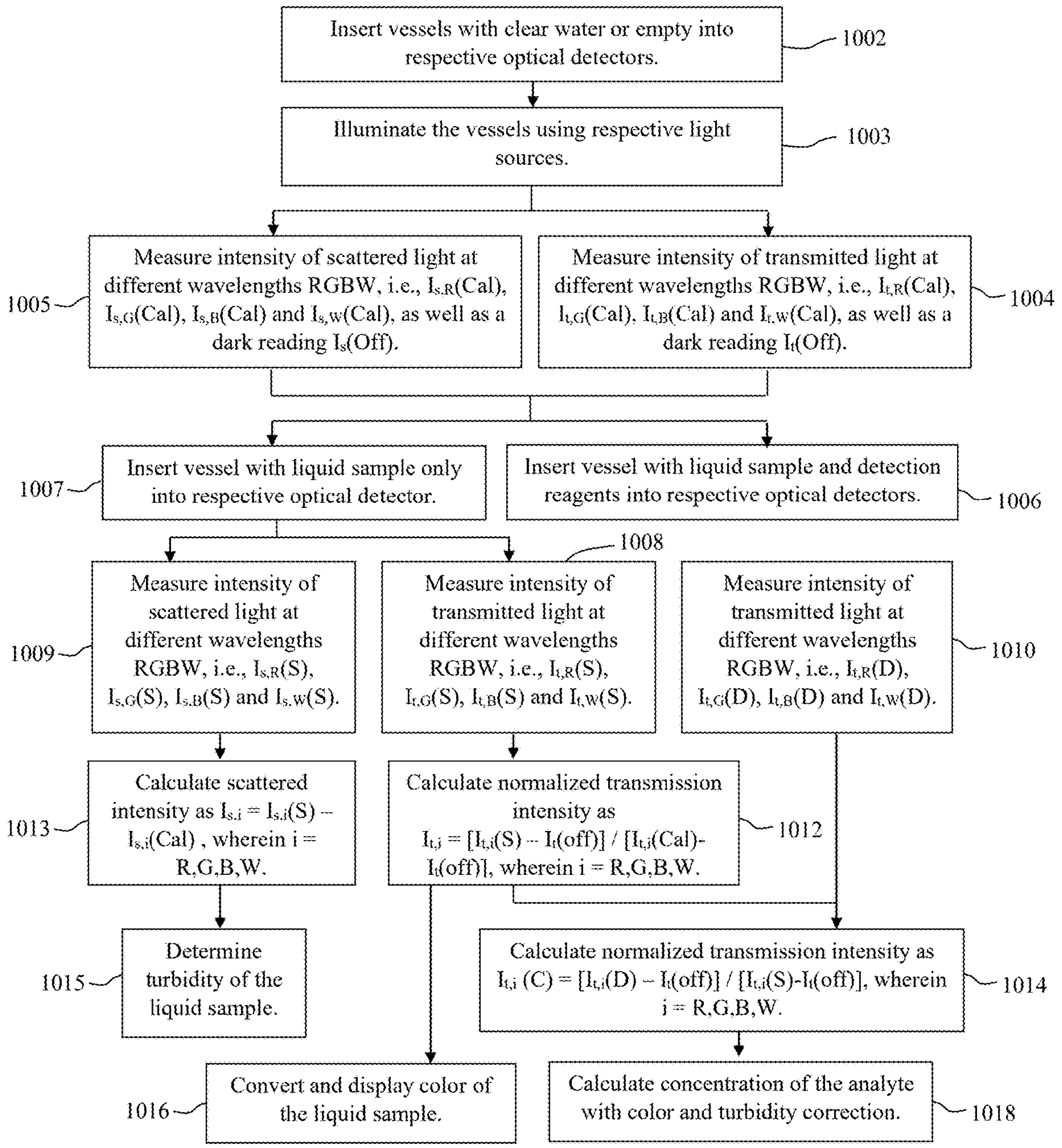
FIG. 10 is a diagram illustrating an exemplary methodology for simultaneous color measurement and correction according to an embodiment of the present invention.

FIG. 10 is a diagram illustrating an exemplary methodology 1000 for simultaneous color measurement and color correction using, e.g., a multi-channel optical sensing system such as optical sensing system 600 of FIG. 6. Methodology 1000 follows the same procedures as in methodology 300 of FIG. 3 above, except that the measurement steps are performed simultaneously using different optical detectors.

In step 1002, vessels 102*a, b, c, d*, etc. that are either empty or filled with clear water are inserted into the respective optical detectors 100*a, b, c, d*, etc. In step 1003, light sources 106*a, b, c*, etc. are used to simultaneously illuminate vessels 102*a, b, c, d*, etc., respectively. According to an exemplary embodiment, during step 1003 each light source 106*a, b, c, d*, etc. is programmed to cycle through different wavelengths/colors of light (e.g., red (R), green (G), blue (B), white (W), etc.).

In step 1004, sensors 110*a, b, c, d*, etc. are used to measure the intensity of the transmitted light $I_t(\lambda)$ through vessels 102*a, b, c, d*, etc. (empty or filled with clear water) at the different wavelengths RGBW, i.e., $I_{tR}$(Cal), $I_{t,G}$(Cal), $I_{t,B}$(Cal) and $I_{t,W}$(Cal) as well as dark reading $I_t$(Off), wherein 'Cal' denotes calibration.

In step 1005, sensor 112 is used to measure the intensity of the scattered light $I_s(\lambda)$ through vessel 102*a* at the different wavelengths RGBW, i.e., $I_{s,R}$(Cal), $I_{s,G}$(Cal), $I_{s,B}$ (Cal) and $I_{s,W}$(Cal) as well as dark reading $I_s$(Off), wherein 'Cal' denotes calibration. It is notable that, as described above, for a well isolated system it is not necessary to take a dark reading.

In step 1006, vessels 102*b, c, d*, etc. with samples mixed with reagents are inserted into the respective optical detectors 100*b, c, d*, etc. In step 1007, vessel 102*a* with liquid sample without detection reagent is inserted into the respective optical detector 100*a*. For instance, according to an exemplary embodiment, vessel 102*a* is filled with a liquid sample and is inserted into optical detector 100*a*, vessel 102*b* is filled with a liquid sample mixed with a detection reagent and is inserted into optical detector 100*b*, and vessel 102*c* is filled with the liquid sample mixed with another detection reagent and is inserted into optical detector 100*c*.

Depending on the type of the reagent used, it might be necessary to just the liquid sample in vessel 102*a* to match the dilution level of liquid samples in vessels 102, *b*, *c*, and *d*. If the reagents are dry, then there is no adjustment need. However, if the reagents are liquid, a same amount of clear liquid, such as water or buffer is preferably added to the liquid sample in vessel 102*a*. Alternatively, a liquid sample dilution correction algorithm can be built for various dilution spans that will be used in the detection to accommodate the detection reagents that require different sample and liquid reagent ratios. A dilution calibration curve can be obtained by adding various amounts of the clear liquid to each detection reagent (reagents for different analyte may have different colors) and measure the transmittance. The plot of transmittance versus the dilution factor for the reagent can be programed into the calculation of the analyte detection.

In step 1008, sensor 110*a* is used to measure the intensity of the transmitted light $I_t(\lambda)$ through vessel 102*a* at the different wavelengths RGBW, i.e., $I_{t,R}$(S), $I_{t,G}$(S), $I_{t,B}$(S) and $I_{t,W}$(S), wherein 't' denotes transmission, and 'S' denotes sample. In step 1009, sensor 112*a* is used to measure the intensity of the scattered light $I_s(\lambda)$ through vessel 102*a* at the different wavelengths RGBW, i.e., $I_{s,R}$(S), $I_{s,G}$(S), $I_{s,B}$(S) and $I_{s,W}$(S), wherein 's' denotes transmission, and 'S' denotes sample. In step 1010, sensors 110*b, c, d*, etc. are used to measure the intensity of the transmitted light $I_t(\lambda)$ through vessels 102*b, c, d*, etc. at the different wavelengths RGBW, i.e., $I_{t,R}$(D), $I_{t,G}$(D), $I_{t,B}$(D) and $I_{t,W}$(D), wherein 'D' denotes the presence of the detection reagent(s). Steps 1008, 1009 and 1010 are performed simultaneously.

In step 1012, the normalized sample transmission intensity is calculated for the RGBW wavelengths of light as:

$$I_{t,i} = [I_{t,i}(S) - I_t(\text{off})]/[I_{t,i}(Cal) - I_t(\text{off})],$$

wherein i=R,G,B,W. As described above, the normalized transmission intensity can then be converted to a 16 bit RGB color value by multiplying by 255 (step 1016). In step 1013, scattering intensity is calculated for RGBW wavelength of lights as $I_{s,i}=I_{s,i}(S)-I_{s,i}(Cal)$, which can be correlated to turbidity properties of the sample (step 1015). In step 1014, the normalized detection transmission intensity is calculated for the RGBW wavelengths of light as:

$$I_{t,i}(C) = [I_{t,i}(D) - I_t(\text{off})]/[I_{t,i}(S) - I_t(\text{off})],$$

wherein i=R,G,B,W, and "C" denotes corrected. As provided above, $I_{t,i}$(C) can then be input into a fit equation from a calibration curve to calculate analyte (e.g., leucocytes, nitrate, protein, etc.) concentrations with color and turbidity of the samples corrected (step 1018).

Figure 11:
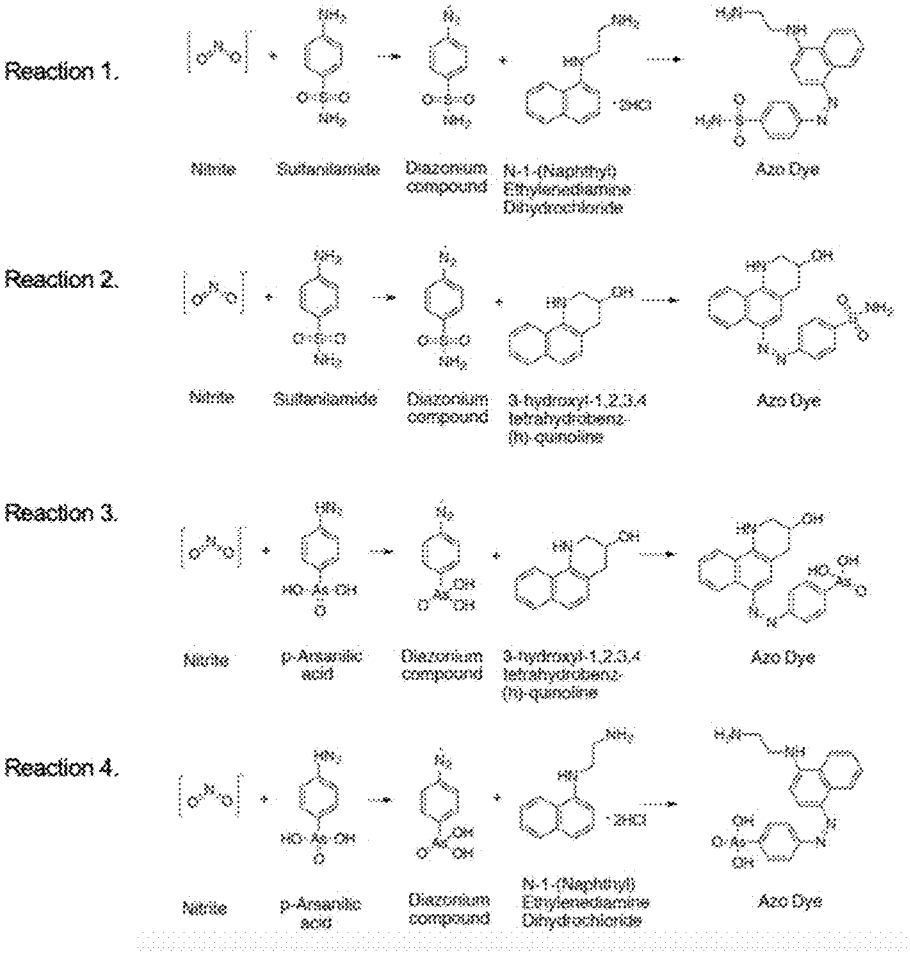
FIG. 11 is a schematic diagram illustrating four chemical reactions using Greiss reagents for nitrite detection according to an embodiment of the present invention.

The present techniques are further described by way of reference to the following non-limiting examples. Example 1: an exemplary embodiment of the sensor being used for nitrite detection will first start with a liquid or dried reagents in vessel 102. This nitrite detection chemistry can be any reagents that detect nitrite selectivity. For example, FIG. 11 illustrates a schematic of four common Greiss reactions used to detect nitrite. The Greiss reaction is when nitrite in an acidic medium, reacts with an aromatic amine (p-Arsanilic acid or sulfanilamide) to form a diazonium compound that reacts with a coupling reagent (i.e. N–1(Naphthyl)ethylenediamine dihydrochloride (NED) or 3-hydroxyl-1,2,3,4-tetrahydrobenz(h)-quinoline) to form a pink colored azo dye. The degree of pinkness is correlated to the nitrite concentration.

Figure 12:
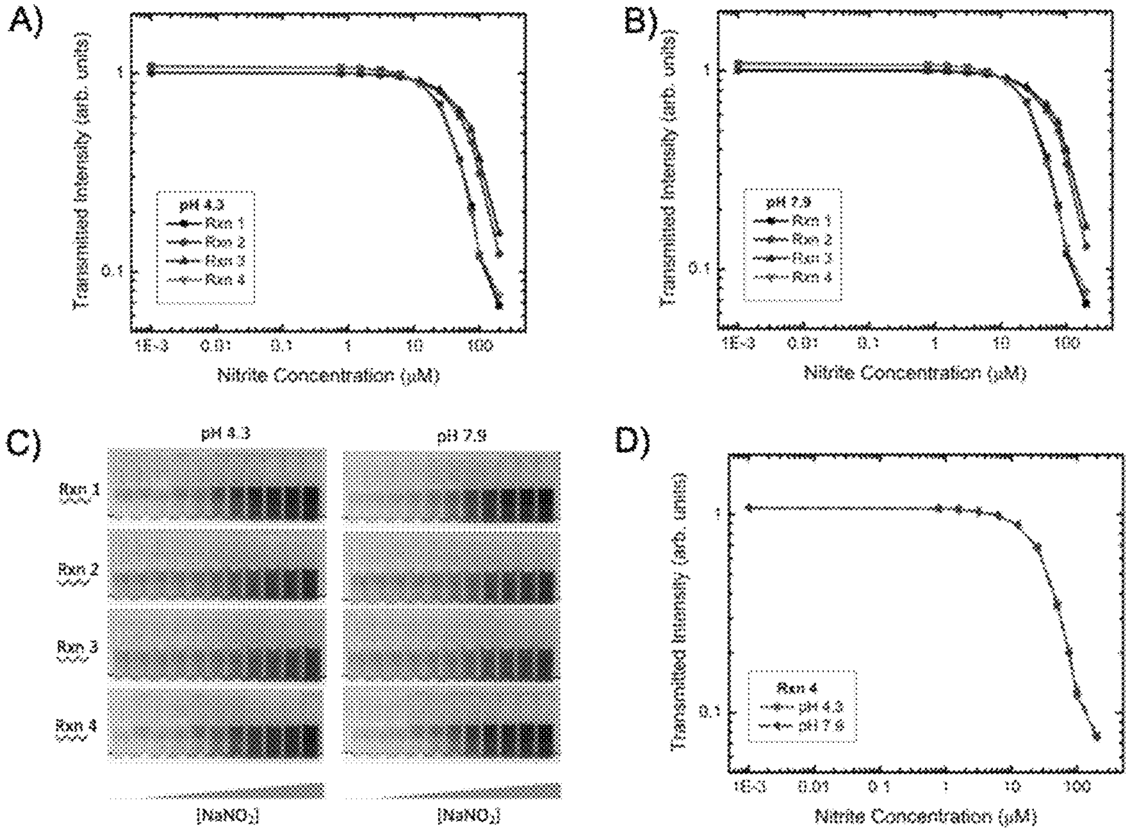
FIG. 12A is a diagram illustrating the detection of varying concentrations of nitrite in a 5 mM Hydrion buffer at pH 4.3 according to an embodiment of the present invention.
FIG. 12B is a diagram illustrating the detection of varying concentrations of nitrite in a 5 mM Hydrion buffer at pH 7.9 according to an embodiment of the present invention.
FIG. 12C is a diagram illustrating the color of the cuvettes at pH 4.3 and pH 7.9 with increasing nitrite concentrations according to an embodiment of the present invention.
FIG. 12D is a diagram illustrating the pH-independence of reaction 4 for nitrite detection according to an embodiment of the present invention.
Figure 13:
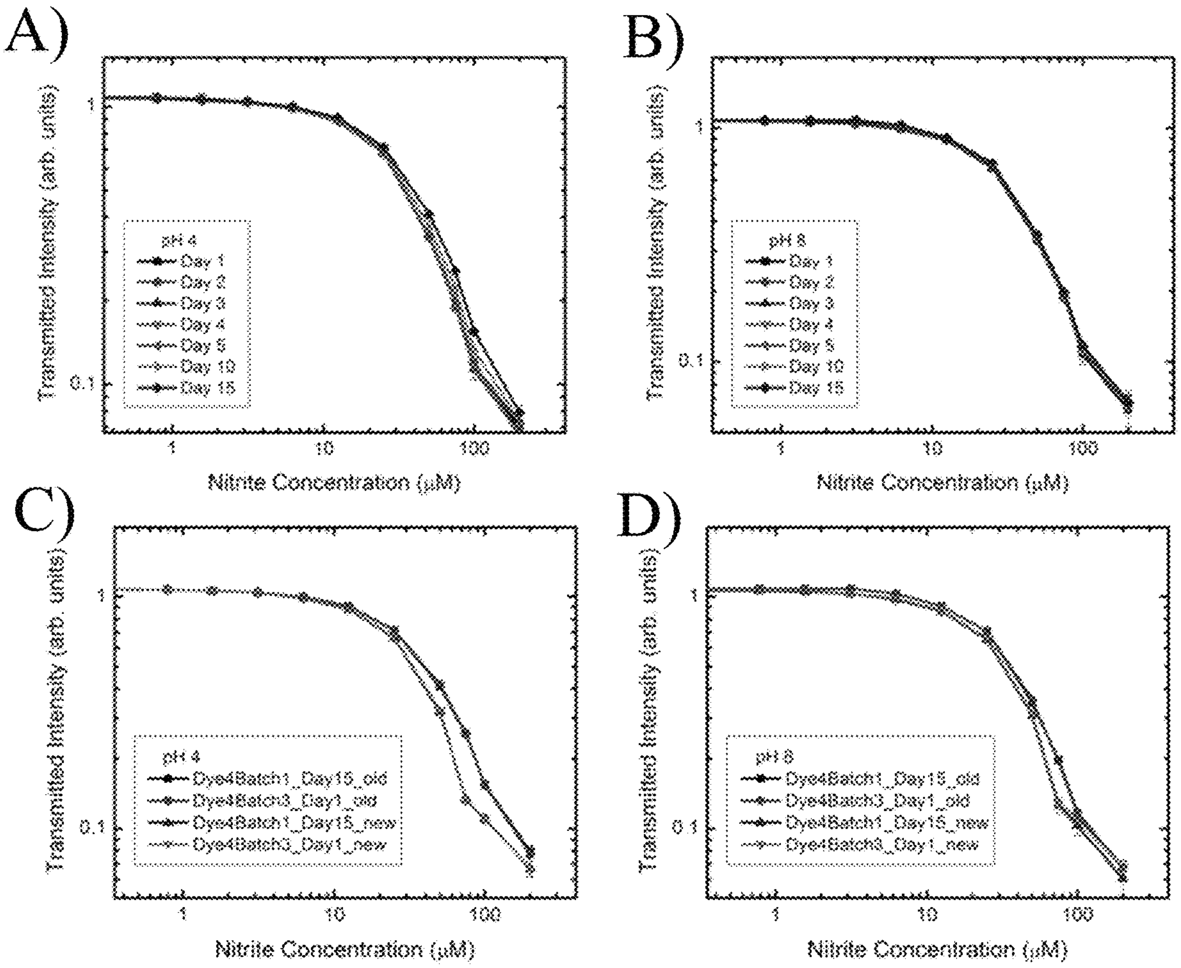
FIG. 13A is a diagram illustrating stability data for nitrite detection chemistry (Reaction 4) stored at 4° C. at pH 4 over the period of 15 days according to an embodiment of the present invention.
FIG. 13B is a diagram illustrating stability data for nitrite detection chemistry (Reaction 4) stored at 4° C. at pH 8 over the period of 15 days according to an embodiment of the present invention.
FIG. 13C is a diagram illustrating stability data for nitrite detection chemistry (Reaction 4) stored at 4° C. at pH 4 using two batches of dye (one stored for 15 days, and one prepared fresh) to measure nitrite solutions prepared fresh (new) and ones prepared 15 days prior (old) according to an embodiment of the present invention.
FIG. 13D is a diagram illustrating stability data for nitrite detection chemistry (Reaction 4) stored at 4° C. at pH 8 using two batches of dye (one stored for 15 days, and one prepared fresh) to measure nitrite solutions prepared fresh (new) and ones prepared 15 days prior (old) according to an embodiment of the present invention.

Reaction 1 combines sulfanilamide and NED to detect nitrite. The use of NED and sulfanilamide has been established as the European standard for determining nitrite concentrations in drinking water (BS EN ISO13395). Reaction 2 is the chemical reaction used on the Chemistrip dipstick by Roche Diagnostics. Reaction 3 is the chemical reaction used by the Multistix dipstick by Siemens Medical Solutions. Reaction 4 is a combination of Reactions 1 and 3 and was found to be the most sensitive at measuring nitrite concentrations from 0-200 μM in 5 mM Hydrion Buffer in pH 4.3 (FIG. 12A) and pH 7.9 (FIG. 12B). FIG. 12C shows the color of the cuvettes at pH 4.3 and pH 7.9 with increasing nitrite concentrations. FIG. 12D illustrates the pH-independence of reaction 4 for nitrite detection. Reaction 4 was also the most resistant to color change at low concentrations over time and was stable at 4° C. for at least 15 days (see FIGS. 13A-B). FIGS. 13A and 13B are diagrams illustrating stability data for nitrite detection chemistry (Reaction 4) stored at 4° C. at pH 4 or pH 8, respectively, over the period of 15 days. Interestingly, it was also determined that the slight signal deviations observed at higher nitrite concentrations on Day 1 versus Day 5 onwards, was due to the reduction of nitrite to nitrous oxide and not due to a degradation in the dye (see FIGS. 13C-D). FIGS. 13C and 13 D are diagrams illustrating stability data for nitrite detection chemistry (Reaction 4) stored at 4° C. at pH 4 or at pH 8, respectively, using two batches of dye (one stored for 15 days, and one prepared fresh) to measure nitrite solutions prepared fresh (new) and ones prepared 15 days prior (old) Here a new set of nitrite solutions was prepared, along with a new batch of dye. Using the 15 day old dye with the new nitrite solution resulted in the same data curve as using a fresh batch of dye with the same nitrite solution.

Figure 14:
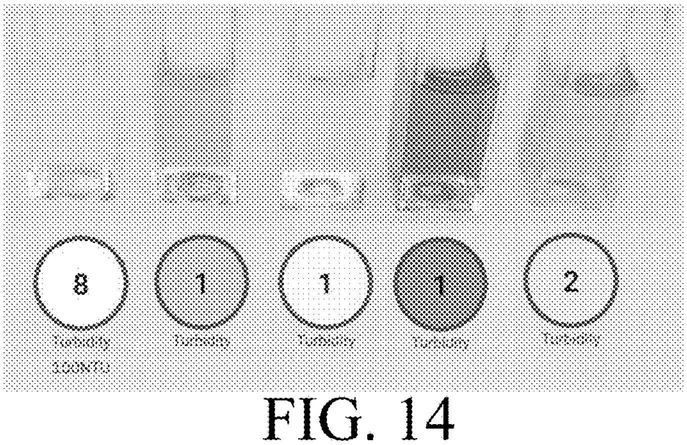
FIG. 14 is a diagram illustrating the color and turbidity measurement of liquid using the present techniques according to an embodiment of the present invention.

Example 2—Color and Turbidity measurement: FIG. 14 is an image of clear cuvettes on the top filled with colored liquids with the measured color displayed in the circle below each corresponding sample. The color and turbidity are measured by methodologies 200, 300 and 400 described in conjunction with the descriptions of FIGS. 2, 3 and 4, above. The displayed color is a realistic representation of the color of the sample. The number within the circle is the scattering intensity which is an indication of turbidity. The higher the scattering intensity is, the cloudier the sample is. A 100 NTU (Nephelometric turbidity unit), OD 0.22, sample had a measured scattering intensity of 8 arbitrary units (a.u.).

Figure 15:
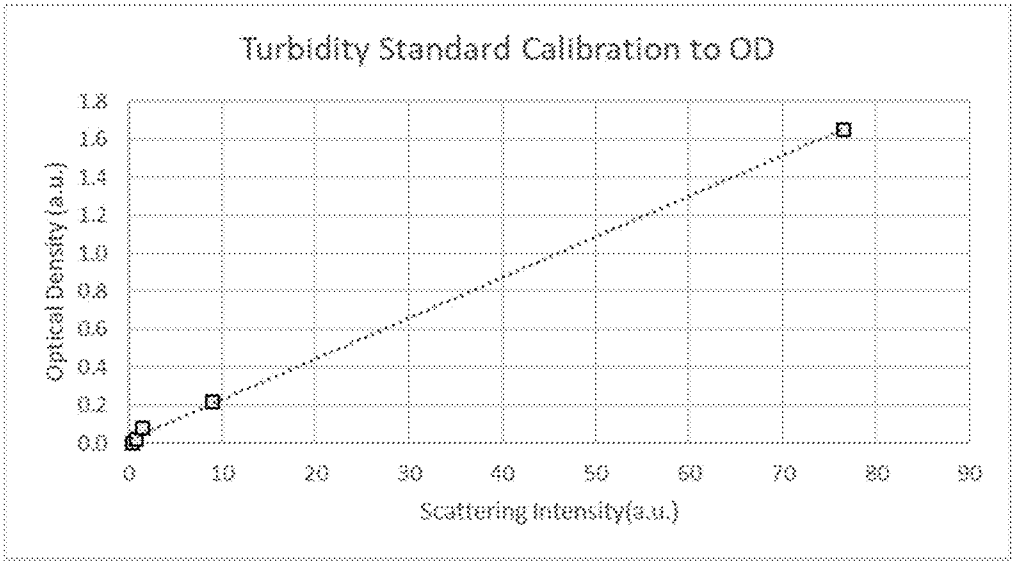
FIG. 15 is diagram illustrating the relationship between scattering intensity and optical density according to an embodiment of the present invention.
Figure 16:
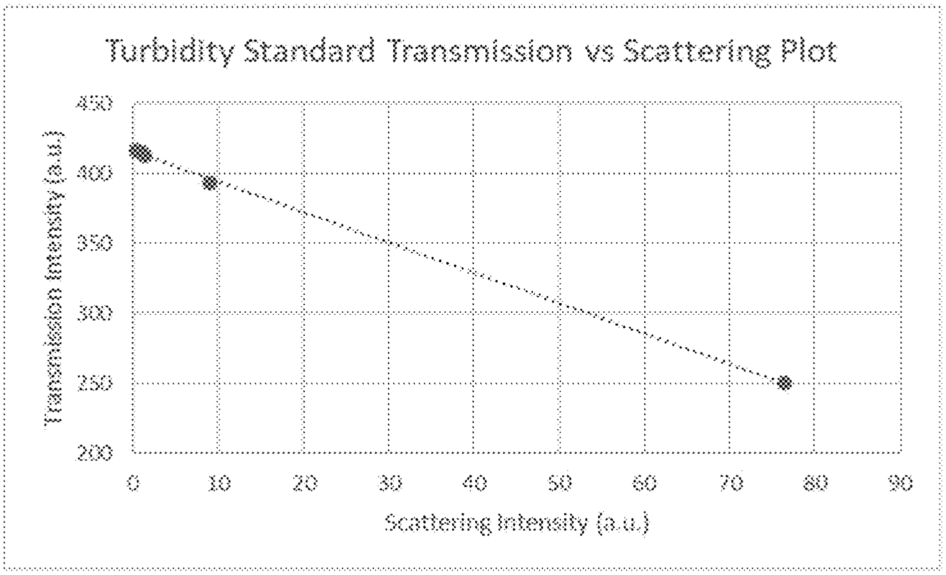
FIG. 16 is a diagram illustrating the relationship between scattering intensity and transmission intensity according to an embodiment of the present invention.

FIG. 15 is a calibration curve to correlate scattering intensity to optical density (OD) for Formazin turbidity standards form Hach (Loveland, CO). The scattering intensity is an indicator of turbidity level. Since the scattering is particle size and wavelength dependent, different types of samples will have different calibration curves. In practices, one can just use scattering intensity as a representation of turbidity. FIG. 16 is a plot of transmission intensity versus scattering intensity for the Formazin turbidity standards. As expected, the transmission intensity decreases when scattering intensity increase. Please note this plot depends on the particle size and wavelength as do all the turbidity measurements, so it should not be generalized to other type of the samples. For the transmissive colorimetric measurement, the effect of the turbidity, is similar to that of adding dye (i.e. color) to the sample, which is the reduction of transmission intensity. This drop in intensity, if not corrected, can result false higher analyte concentration. Note that color correction for the normalized detection reagent transmission intensity described in Equation 2 above already corrects for any reduction in transmission thru the liquid sample without added reagent, so this effectively also corrects for the drop in intensity caused by scattering from turbidity. The scattering intensity serves as an indicator of the degree of turbidity effect. Similarly, the color of the sample measured serve as an indicator of the color effect.

As mentioned previously, the color of a urinalysis sample can vary depending on factors such as hydration, food and/or medication intake, etc. The color of the sample will impact the transmission measurement, which in turn will affect the accuracy of the detection of analyte.

Figure 17A:
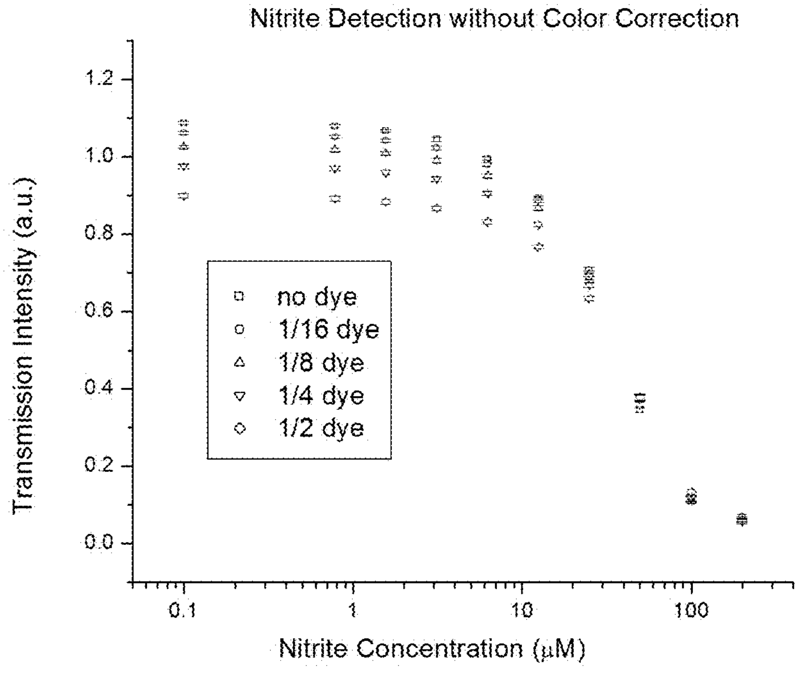
FIG. 17A is a diagram illustrating nitrite detection with dye added samples according to an embodiment of the present invention.
Figure 17B:
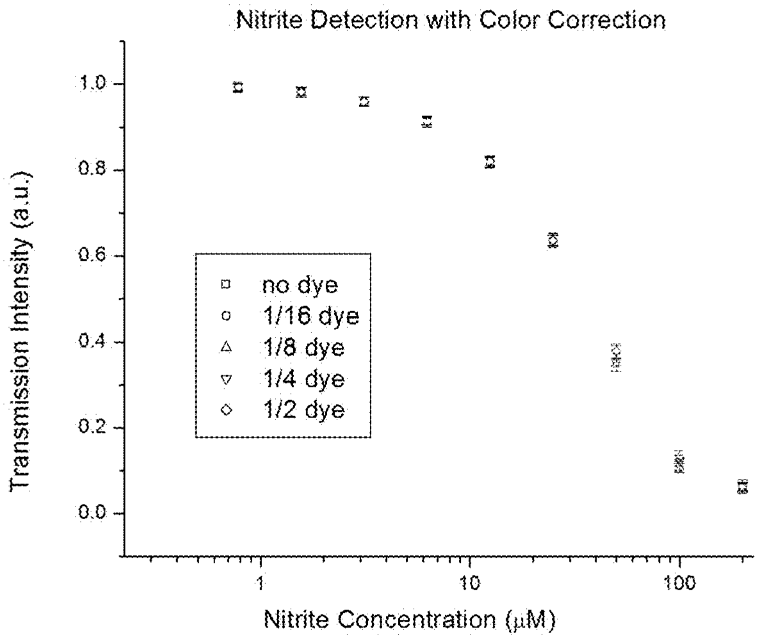
FIG. 17B is a diagram illustrating color corrected nitrite detection with dye added samples as in FIG. 17A according to an embodiment of the present invention.

To demonstrate color effect on nitrite detection, a water soluble yellow-brown dye was used with dilution factor ranging for 2, 4, 8, 16× in 100 mM phosphor buffer (PB) at pH 6 as a base matrix and doped with various nitrite concentrations for each of the dye mixtures. The nitrite concentrations started with 200 uM, and were sequential diluted to 100, 50, 25, 12.5, 6.25, and 3.125 uM. A non-nitride-doped sample was included for each of the dye concentrations as a control. Plots of the transmittance for green illumination versus nitrite concentration for different dye concentrations before and after color correction are shown in FIG. 17A and FIG. 17B, respectively. The ½ dye added sample, is 2× diluted, has the most color which means the most absorption due to color and 16× the lightest color or least absorption due to color. FIG. 17A shows that transmission was reduced to 82% from the no dye sample to the ½ dyed samples. The data points for no dye, correspond to the calibration curve in this case. Thus, the measured intensity for the 6.25 uM nitrite sample with the ½ dye would correspond roughly to a nitrite concentration midway between of 12.5 and 25 uM, or roughly 19 uM, which would be a 3× error in concentration. The errors are even larger if the samples with nitrite concentrations of zero are considered. FIG. 17B is a replot of the data in FIG. 17A after the color correction method described in conjunction with the description of methodology 300 of FIG. 3, above has been applied. The error introduced by the reduction of light intensity from the dye has been corrected for especially for the lower nitrite concentration samples which is important for improving accuracy and sensitivity for early detection.

Figure 18A:
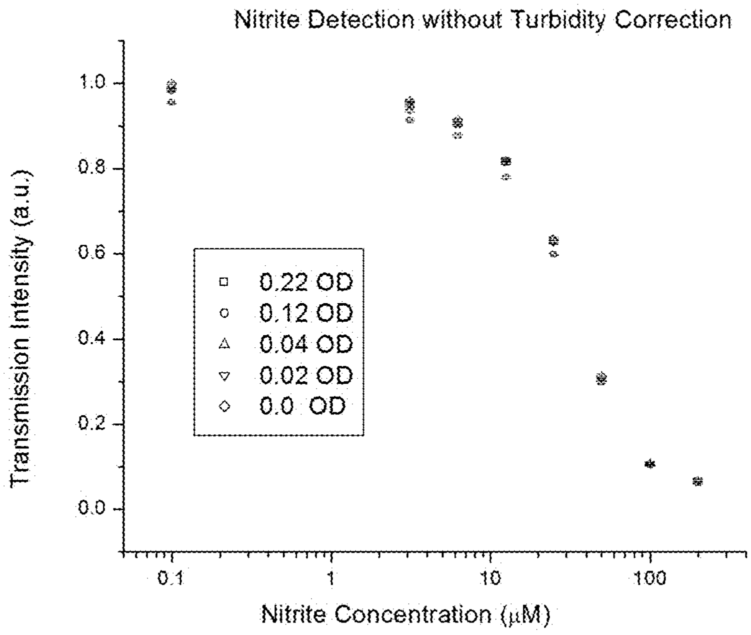
FIG. 18A is a diagram illustrating nitrite detection with various turbidity levels according to an embodiment of the present invention.
Figure 18B:
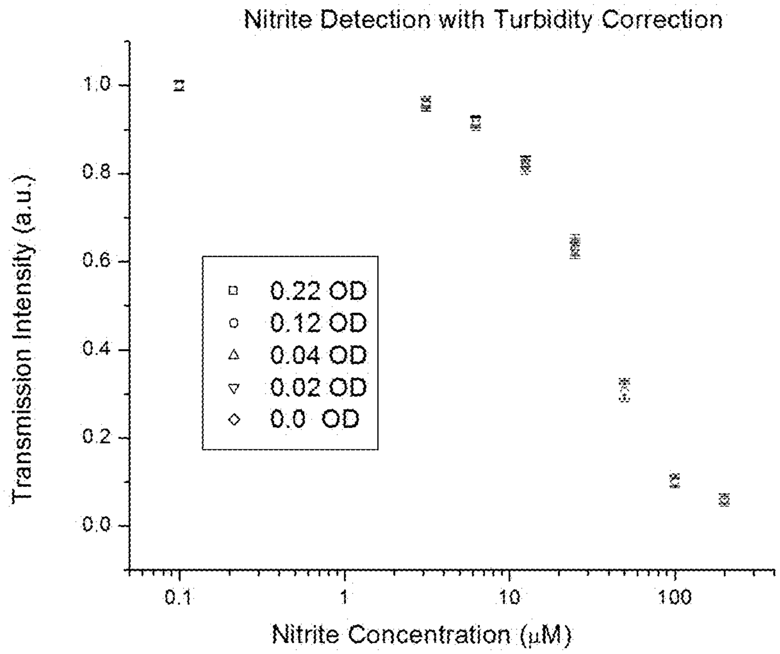
FIG. 18B is a diagram illustrating nitrite detection with the turbidity corrected according to an embodiment of the present invention.

The same correction method applies to turbidity, since the turbidity effect on the transmission is intensity reduction. To determine the turbidity effect, stabilized Formazin turbidity standard of 800 NTU, from Hach (Loveland, CO), is used as stock solution, sequentially diluted by water to 2, 4, 8, and 16 times dilution, the optical densities are 0.22, 0.12, 0.04, 0.02 respectively. A water (OD=0) based sample is included as control. Then 2 ml of each of the diluted turbidity solutions is nitrite doped to make 200 uM Nitrite solution. This concentrated nitrite solution is then sequential diluted to 100, 50, 25, 12.5, 6.25, and 3.125 uM nitrite concentration with each remaining diluted solution. 1 ml of the sample is pipetted into a 4 sides clear cuvette. Transmission and scattering intensity are measured on the colorimeter, optical density is measured by NanoDrop one. The optical density versus scattering intensity for the diluted turbidity sample series can be used to convert the scattering intensity to a turbidity measurement unit. Nitrite detection dye (see above) is then added into cuvette for nitrite detection. The transmission and scattering intensities of the mixture are measured again using the colorimeter. FIG. 18A is a plot of transmission intensity versus nitrite concentration for samples with different dilution factors from 800 NTU turbidity standard. The transmission intensity drops as the turbidity of the sample increases. FIG. 18B is a replot of FIG. 18A with turbidity correction. The accuracy of the nitrite detection is improved by 5%. In addition to color and turbidity, pH, protein, ascorbic acid, and other substance can interfere with the accuracy of analyte measurements. By simultaneous multiplexing measurement, or if some of the interference substances are known by other methods, a machine learning algorithm can be developed to correct the interference effect from the one or more substances.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for quantitative measurement of an analyte, comprising:

- providing a colorimetric device comprising an optical detector, wherein the optical detector comprises:
  - a light source on a first face of a cuboid housing for a vessel;
  - a first sensor on a second face of the cuboid housing opposite the light source and along a light path of the light source;
  - a second sensor on a third face of the cuboid housing and at an angle θ with respect to the light path; and
  - an electronics module in communication with a computer system;
- illuminating a first sample of a liquid in the vessel by cycling the light source through different colors of light;
- measuring, by the first sensor, sample transmission intensities and, by the second sensor, sample scattering intensities of the different colors of light through the illuminated first sample;
- illuminating a second sample of the liquid mixed with a detection reagent in the vessel by cycling the light source through the different colors of light;
- measuring, by the first sensor, detection reagent transmission intensities and, by the second sensor, detection reagent scattering intensities of the different colors of light through the illuminated second sample;
- normalizing, by the computer system, the detection reagent transmission intensities based on the sample transmission intensities; and
- determining, by the computer system, a concentration and an optical density of the analyte based on calibration curves and, respectively, the normalized detection reagent transmission intensities and the detection reagent scattering intensities.

2. The method of claim 1, wherein θ is within a range of about 0 degrees to about 180 degrees.

3. The method of claim 1, wherein θ is about 90 degrees.

4. The method of claim 1, wherein the first sensor and the second sensor are independently selected from the group consisting of: a photodetector, a photodiode, and a charge-coupled device/complementary metal oxide semiconductor CCD/CMOS imager.

5. The method of claim 1, wherein the different colors of light are red, green, blue and white (RGBW) wavelengths of light.

6. The method of claim 5, further comprising:
converting, by the computer system, the normalized detection reagent transmission intensities to an RGB color value; and
rendering, on a user interface of the computer system, a reconstruction of the color of the first sample based on the RGB color value.

7. The method of claim 1, further comprising:
generating, by the computer system, a net scattering intensity or normalized scattering intensity calculated from the detection reagent scattering intensities; and
outputting, via an interface of the computer system, a diagnostic result based on the net scattering intensity or normalized scattering intensity.

8. The method of claim 1, wherein the colorimetric device further comprises first and second baffles between the vessel and, respectively, the first and second sensors to block ambient light during the illuminating.

9. The method of claim 1, further comprising simultaneously measuring transmission and scattering intensities for multiple samples.

10. A method for color and turbidity analysis, comprising:
providing a colorimetric device comprising an optical detector, wherein the optical detector comprises:
a light source on a first face of a cuboid housing for a vessel;
a first sensor on a second face of the cuboid housing opposite the light source and along a light path of the light source;
a second sensor on a third face of the cuboid housing and at an angle θ with respect to the light path; and
an electronics module in communication with a computer system;
illuminating a liquid sample in the vessel by cycling the light source through different colors of light i;
measuring, by the first sensor, sample transmission intensities $I_{t,i}(S)$ and, by using the second sensor, sample scattering intensities $I_{s,i}(S)$ of the different colors of light i through the illuminated liquid sample;
illuminating the liquid sample mixed with at least one detection reagent in the vessel by cycling the light source through the different colors of light i;
measuring, by the first sensor, detection reagent transmission intensities $I_{t,i}(D)$ and, by the second sensor, detection reagent scattering intensities $I_{s,i}(D)$ of the different colors of light through the illuminated liquid sample mixed with the at least one detection reagent;
determining, by the computer system, a concentration and an optical density of an analyte based on calibration curves and, respectively, the detection reagent transmission intensities $I_{t,i}(D)$ and the detection reagent scattering intensities $I_{s,i}(D)$;
determining, by the computer system, a color of the liquid sample based on the sample transmission intensities $I_{t,i}(S)$; and
determining, by the computer system, a turbidity of the liquid sample based on the sample scattering intensities $I_{s,i}(S)$.

11. The method of claim 10, wherein θ is within a range of about 0 degrees to about 180 degrees.

12. The method of claim 10, wherein θ is about 90 degrees.

13. The method of claim 10, wherein the first sensor and the second sensor are independently selected from the group consisting of: a photodetector, a photodiode, and a charge-coupled device/complementary metal oxide semiconductor CCD/CMOS imager.

14. The method of claim 10, wherein the vessel comprises optically transparent windows for optical sensing.

15. The method of claim 10, wherein:
the different colors of light are red, green, blue, and white (RGBW) wavelengths of light.

16. The method of claim 15, further comprising:
illuminating a calibration blank in the vessel by cycling the light source through the RGBW wavelengths of light; and
measuring, by the first sensor, calibration transmission intensities $I_{t,i}(Cal)$, where i=R, G, B, W, of the different colors of light through the illuminated calibration blank, as well as a dark reading $I_t(Off)$.

17. The method of claim 16, further comprising:
calculating, by the computer system, normalized detection reagent transmission intensities $I_{t,i}(C)$ for the liquid sample mixed with at least one detection reagent as: $I_{t,i}–(C)=[I_{t,i}(D)–I_{t,i}(off)]/[I_{t,i}(S)–I_t(off)]$, wherein i=R, G,B,W.

18. The method of claim 16, further comprising:
measuring, by the second sensor, calibration scattering intensities $I_{s,i}(Cal)$ of the RGBW wavelengths of light through the illuminated calibration blank, as well as a second dark reading $I_s(Off)$; and
calculating at least one of a normalized scattering intensity and a net scattering intensity for the liquid sample, wherein the normalized scattering intensity is calculated for the liquid sample as $I_{s,i}–(N)=[I_{s,i}(S)–I_{s,i}(Cal)]/I_{t,i}–(Cal)$, wherein i=R,G,B,W, and wherein the net scattering intensity for the liquid sample is calculated as $I_{s,i}=I_{s,i}(S)–I_{s,i}(Cal)$, wherein i=R,G,B,W.

19. The method of claim 10, further comprising:
preloading at least one detection reagent into the vessel under a vacuum; and
sealing the vessel to preserve the vacuum within the vessel, wherein the vessel is sealed with a rubber cap.

20. The method of claim 10, wherein the colorimetric device further comprises at least one additional optical detector.

* * * * *